(12) United States Patent
Yang et al.

(10) Patent No.: US 12,363,618 B2
(45) Date of Patent: Jul. 15, 2025

(54) COMMUNICATION METHOD AND RELATED DEVICE

(71) Applicant: HUAWEI TECHNOLOGIES CO., LTD., Guangdong (CN)

(72) Inventors: Chenchen Yang, Ottawa (CA); Weisheng Jin, Shanghai (CN); Yinghao Jin, Billancourt (FR); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 17/866,001

(22) Filed: Jul. 15, 2022

(65) Prior Publication Data

US 2022/0353798 A1 Nov. 3, 2022

Related U.S. Application Data

(63) Continuation of application No. PCT/CN2020/072869, filed on Jan. 17, 2020.

(51) Int. Cl.
  *H04W 48/16* (2009.01)
  *H04W 76/10* (2018.01)
  *H04W 84/04* (2009.01)

(52) U.S. Cl.
  CPC .......... *H04W 48/16* (2013.01); *H04W 76/10* (2018.02); *H04W 84/042* (2013.01)

(58) Field of Classification Search
  CPC .... H04W 48/16; H04W 76/10; H04W 84/042
  See application file for complete search history.

(56) References Cited

U.S. PATENT DOCUMENTS

| 10,517,021 | B2 | 12/2019 | Feldman et al. |
| 2016/0226249 | A1 | 8/2016 | Sakuma et al. |
| 2020/0092774 | A1* | 3/2020 | Sharma ........... H04W 36/00835 |

FOREIGN PATENT DOCUMENTS

| CN | 110049578 A | 7/2019 |
| CN | 110213808 A | 9/2019 |
| CN | 110536331 A | 12/2019 |

OTHER PUBLICATIONS

Office Action in Chinese Appln. No. 202080054679.6, dated Nov. 14, 2022, 10 pages (with English translation).

(Continued)

*Primary Examiner* — Diane D Mizrahi
(74) *Attorney, Agent, or Firm* — Fish & Richardson P.C.

(57) ABSTRACT

Embodiments of this application provide example communication methods and example devices. One example method includes sending, by a first access network device, a system information block to a terminal device, where the system information block includes first information indicating that a cell served by the first access network device supports non-public network (NPN) onboarding, where the first information includes second information indicating a supported onboarding NPN, and the second information includes at least one of information about an identifier of the supported onboarding NPN or first indication information, where the first indication information indicates a support of onboarding. The first access network device can then receive a radio resource control (RRC) setup complete message from the terminal device, where the RRC setup complete message indicates that the terminal device requests NPN onboarding.

20 Claims, 11 Drawing Sheets

(56) References Cited

OTHER PUBLICATIONS

3GPP TR 22.827 V17.1.0 (Dec. 2019), "3rd Generation Partnership Project; Technical Specification Group Services and System Aspects; Study on Audio-Visual Service Production Stage 1 (Release 17)," Dec. 2019, 78 pages.
Ericsson et al., "Solution for UE Onboarding and provisioning for an SNPN," SA WG2 Meeting #S2-136, S2-1911961, Reno, USA, Nov. 18-24, 2019, 6 pages.
PCT International Search Report and Written Opinion issued in International Application No. PCT/CN2020/072869 on Sep. 29, 2020, 15 pages (with English translation).
Intel, "Solution for UE Onboarding in Non-Public Networks," 3GPP SA WG2 Meeting #136, S2-1911356, Reno, USA, Nov. 18-22, 2019, 2 pages.
Ericsson, "User Plane Based Solution to Onboarding KI#4," 3GPP TSG-SA WG2 Meeting #136AH, S2-2000192, Incheon, Korea, Jan. 13-17, 2020, 7 pages.
Ericsson, "Control Plane Based Solution to Onboarding KI#4," 3GPP TSG-SA WG2 Meeting #136AH, S2-2001368, Jan. 13-18, 2020, Incheon, Korea, 6 pages
Extended European Search Report in European Appln No. 20913932. 8, dated Dec. 7, 2022, 15 pages.

\* cited by examiner

COMMUNICATION METHOD AND RELATED DEVICE

CROSS-REFERENCE TO RELATED APPLICATIONS

This application is a continuation of International Application No. PCT/CN2020/072869, filed on Jan. 17, 2020, the disclosure of which is hereby incorporated by reference in its entirety.

TECHNICAL FIELD

This application relates to the field of network technologies, and in particular, to a communication method and a related device.

BACKGROUND

A non-public network (non-public networks, NPN) is a network being discussed in the 3rd generation partnership project (3rd generation partnership project, 3GPP) standard. Different from a conventional cellular network, the NPN network only allows access of some users with specific permission. In an existing standard, a terminal device cannot access an NPN network that is not onboarded by the terminal device, affecting communication efficiency.

SUMMARY

This application provides a communication method and a related device, to expect to improve communication efficiency.

According to a first aspect, an embodiment of this application provides a communication method, including. A first access network device sends a first message to a terminal device, where the first message indicates that a cell served by the first access network device supports NPN onboarding; and receives a second message sent by the terminal device, where the second message indicates that the terminal device requests NPN onboarding. The access network device indicates a supported onboarding NPN to the terminal device, and the terminal device may request NPN onboarding, so that the terminal device and a network side can dynamically update information about an NPN that is onboarded by the terminal device, and the terminal device can flexibly access an NPN that is not onboarded by the terminal device. In this way, communication efficiency is improved.

In a possible design, the first message includes information indicating a supported onboarding NPN, and the information indicating the supported onboarding NPN includes at least one of the following: information about an identifier of a first network or first indication information. The information about the identifier of the first network is information about an identifier of the supported onboarding NPN, and the first indication information indicates a support of onboarding.

In another possible design, the first message includes information about a network resource, and the network resource is a resource used by the terminal device to request NPN onboarding.

In another possible design, the second message includes information indicating a requested onboarding NPN, and the information indicating the requested onboarding NPN includes at least one of the following: information about an identifier of a second network or second indication information. The information about the identifier of the second network is information about an identifier of the requested onboarding NPN, and the second indication information indicates a request for onboarding.

In another possible design, the information about the identifier of the second network may be the same as the information about the identifier of the first network, and the first indication information may also be the same as the second indication information.

In another possible design, the second message includes information about an identifier of a second network and information about an identifier of a third network, the second network is a requested onboarding network, and the third network is an onboarded network. In this way, not only random access to a cell can be implemented, but also onboarding can be implemented.

In another possible design, the second message is used to request to access a first cell served by the first access network device. The first access network device verifies whether the terminal device has onboarded at least one NPN supported by the first cell; and if the terminal device has not onboarded the at least one NPN supported by the first cell, the first access network device determines that the terminal device requests to onboard the NPN supported by the first cell.

In another possible design, the terminal device sends the second message to the first access network device by using the network resource indicated by the first message. The first access network device determines, based on a network resource on which the second message is located, the onboarding NPN requested by the terminal device. Optionally, the second message is used by the terminal device to request to access the first cell served by the first access network device.

In another possible design, the second message includes information about an identifier of a second network. The first access network device verifies whether the second network is an onboarded network; and if the second network is not an onboarded network, the first access network device determines that the terminal device requests to onboard an NPN corresponding to the information about the identifier of the second network.

In another possible design, the first access network device sends a third message to the terminal device, where the third message indicates that NPN onboarding of the terminal device succeeds.

In another possible design, the third message includes information indicating a successfully onboarded NPN, and the information indicating the successfully onboarded NPN includes at least one of the following: information about an identifier of a fourth network or third indication information. The information about the identifier of the fourth network is information about an identifier of the successfully onboarded NPN, and the third indication information indicates that onboarding succeeds.

In another possible design, the first access network device sends a fourth message to the terminal device, where the fourth message indicates a cause value used by the first access network device to reject the request of the terminal device for NPN onboarding.

In another possible design, the first access network device receives a fifth message sent by a core network device, where the fifth message indicates a cause value used by the core network device to reject the request of the terminal device for NPN onboarding.

In another possible design, the first access network device sends a sixth message to the core network device, where the sixth message indicates that the terminal device requests to NPN onboard. The first access network device receives a seventh message sent by the core network device, where the seventh message indicates that NPN onboarding of the terminal device succeeds or indicates that onboarding of the terminal device fails.

In another possible design, the sixth message includes information indicating a requested onboarding NPN, and the information indicating the requested onboarding NPN includes at least one of the following: information about an identifier of a fifth network or fourth indication information. The information about the identifier of the fifth network is information about an identifier of the requested onboarding NPN, and the fourth indication information indicates a request for onboarding.

In another possible design, the seventh message includes information indicating a successfully onboarded NPN, and the information indicating the successfully onboarded NPN includes at least one of the following: information about an identifier of a sixth network or fifth indication information. The information about the identifier of the sixth network is information about an identifier of the successfully onboarded NPN, and the fifth indication information indicates that onboarding succeeds.

In another possible design, the information about the identifier of the fifth network may be the same as the information about the identifier of the sixth network, and the fourth indication information may also be the same as the fifth indication information.

In another possible design, the seventh message includes fifth indication information, and the fifth indication information indicates whether the terminal device has an onboarding capability. This prevents subsequent malicious onboarding of the terminal device, prevents the terminal device from continuously initiating requests for onboarding, and the like.

In another possible design, the first access network device receives an eighth message sent by the core network device, where the eighth message includes information indicating a supported onboarding NPN, and the information indicating the supported onboarding NPN includes at least one of the following: information about an identifier of a seventh network or seventh indication information. The information about the identifier of the seventh network is information about an identifier of the supported onboarding NPN, and the seventh indication information indicates a support of onboarding.

In another possible design, the first access network device sends a ninth message to the core network device, where the ninth message includes information indicating a supported onboarding NPN, and the information indicating the supported onboarding NPN includes at least one of the following: information about an identifier of an eighth network or eighth indication information. The information about the identifier of the eighth network is information about an identifier of the supported onboarding NPN, and the eighth indication information indicates a support of onboarding.

In another possible design, the first access network device includes a first distributed unit. The first distributed unit sends a first message to the terminal device, where the first message indicates that a cell served by the first distributed unit supports NPN onboarding and/or a cell served by a second distributed unit supports NPN onboarding. The first distributed unit receives a second message sent by the terminal device, where the second message indicates that the terminal device requests NPN onboarding.

In another possible design, the first message may include address information of an N3IWF entity, and the address information indicates that the terminal device requests NPN onboarding from the core network device through the N3IWF entity. The terminal device may set up an IPsec tunnel based on the address information of the N3IWF entity, and request NPN onboarding from the core network device by using the IPsec tunnel that is set up. The terminal device implements NPN onboarding by setting up the IPsec tunnel, to reduce signaling overheads. Optionally, the N3IWF entity may alternatively be another entity, for example, a third-party provider (service provider).

In another possible design, the first access network device receives a tenth message sent by a second access network device, where the tenth message indicates an onboarding NPN supported by a cell served by the second access network device and/or an onboarding NPN supported by a neighboring cell of a cell served by the second access network device. The neighboring cell of the cell served by the second access network device may be deployed on the second access network device, or may be deployed on another access network device.

In another possible design, the first message further indicates an onboarding NPN supported by the cell served by the second access network device.

In another possible design, the first message includes sixth indication information, and the sixth indication information indicates whether a cell in which the terminal device is located supports assisting a second cell in NPN onboarding. Optionally, the second cell is a neighboring cell of the cell in which the terminal device is located. In this way, the terminal device can onboard, in one cell, NPNs supported by a plurality of cells, to reduce signaling overheads of NPN onboarding between the terminal device and the first access network device.

In another possible design, the information about the identifier of the first network includes at least one of the following: a public land mobile network identifier PLMN ID, a network identifier NID, a closed access group identifier CAG ID, or a human readable network identifier HRNN.

According to a second aspect, an embodiment of this application provides a communication method, including: A terminal device receives a first message sent by a first access network device, where the first message indicates that a cell served by the first access network device supports NPN onboarding; and sends a second message to the first access network device, where the second message indicates that the terminal device requests NPN onboarding. The access network device indicates a supported onboarding NPN to the terminal device, and the terminal device may request NPN onboarding, so that the terminal device and a network side can dynamically update information about an NPN that is onboarded by the terminal device, and the terminal device can flexibly access an NPN that is not onboarded by the terminal device. In this way, communication efficiency is improved.

In another possible design, the first message includes information indicating a supported onboarding NPN, and the information indicating the supported onboarding NPN includes at least one of the following: information about an identifier of a first network or first indication information. The information about the identifier of the first network is information about an identifier of the supported onboarding NPN, and the first indication information indicates a support of onboarding.

In another possible design, the first message includes information about a network resource, and the network resource is a resource used by the terminal device to request NPN onboarding.

In another possible design, the second message includes information indicating a requested onboarding NPN, and the information indicating the requested onboarding NPN includes at least one of the following: information about an identifier of a second network or second indication information. The information about the identifier of the second network is information about an identifier of the requested onboarding NPN, and the second indication information indicates a request for onboarding.

In another possible design, the second message includes information about an identifier of a second network and information about an identifier of a third network, the second network is a requested onboarding network, and the third network is an onboarded network. In this way, not only random access to a cell can be implemented, but also onboarding can be implemented.

In another possible design, the terminal device receives a third message sent by the first access network device, where the third message indicates that NPN onboarding of the terminal device succeeds.

In another possible design, the third message includes information indicating a successfully onboarded NPN, and the information indicating the successfully onboarded NPN includes at least one of the following: information about an identifier of a fourth network or third indication information. The information about the identifier of the fourth network is information about an identifier of the successfully onboarded NPN, and the third indication information indicates that onboarding succeeds.

In another possible design, the terminal device receives a fourth message sent by the first access network device, where the fourth message indicates a cause value used by the first access network device to reject the request of the terminal device for NPN onboarding.

According to a third aspect, an embodiment of this application provides a communication method, including: A core network device receives a first message sent by a first access network device, where the first message indicates that a terminal device requests NPN onboarding; and sends a second message to the first access network device, where the second message indicates that NPN onboarding of the terminal device succeeds. The first access network device indicates a requested onboarding NPN to the core network device, and the core network device may indicate the NPN successfully onboarded by the terminal device, so that the terminal device and a network side can dynamically update information about the NPN that is onboarded by the terminal device, and the terminal device can flexibly access an NPN that is not onboarded by the terminal device. In this way, communication efficiency is improved.

In another possible design, the first message includes information indicating a requested onboarding NPN, and the information indicating the requested onboarding NPN includes at least one of the following: information about an identifier of a first network or first indication information.

In another possible design, the first message is used to forward a layer 3 message to the core network device. The core network device verifies whether the terminal device has onboarded at least one NPN supported by a first cell; and if the terminal device has not onboarded the at least one NPN supported by the first cell, the core network device determines that the terminal device requests to onboard the NPN supported by the first cell. The first cell is a cell that the terminal device camps on or accesses.

In another possible design, the first message includes information about an identifier of a first network. The core network device verifies whether the first network is an onboarded network; and if the first network is not an onboarded network, the core network device determines that the terminal device requests to onboard an NPN corresponding to the information about the identifier of the first network.

In another possible design, the first message includes information indicating an onboarding NPN supported by a first cell served by the first access network device, and the information indicating the onboarding NPN supported by the first cell served by the first access network device includes at least one of the following: information about an identifier of a third network or third indication information.

In another possible design, the second message includes information indicating a successfully onboarded NPN, and the information indicating the successfully onboarded NPN includes at least one of the following: information about an identifier of a second network or second indication information.

In another possible design, the core network device sends a third message to the first access network device, where the third message indicates an onboarding NPN supported by the core network device.

In another possible design, the core network device receives a fourth message sent by the first access network device, where the fourth message indicates an onboarding NPN supported by the first access network device.

According to a fourth aspect, an embodiment of this application provides a communication method, including: A first distributed unit sends a first message to a terminal device, where the first message indicates that a cell served by the first distributed unit supports NPN onboarding and/or a cell served by a second distributed unit supports NPN onboarding; and receives a second message sent by the terminal device, where the second message indicates that the terminal device requests NPN onboarding. The first distributed unit indicates a supported onboarding NPN to the terminal device, and the terminal device may request NPN onboarding, so that the terminal device and a network side can dynamically update information about an NPN that is onboarded by the terminal device, and the terminal device can flexibly access an NPN that is not onboarded by the terminal device. In this way, communication efficiency is improved.

In a possible design, the first message includes information indicating a supported onboarding NPN, and the information indicating the supported onboarding NPN includes at least one of the following: information about an identifier of a first network or first indication information. The information about the identifier of the first network is information about an identifier of the supported onboarding NPN, and the first indication information indicates a support of onboarding.

In another possible design, the first message includes second indication information, and the second indication information indicates whether a cell in which the terminal device is located supports assisting a second cell in NPN onboarding. Optionally, the second cell is a neighboring cell of the cell in which the terminal device is located. In this way, the terminal device can onboard, in one cell, NPNs supported by a plurality of cells, to reduce signaling overheads of NPN onboarding between the terminal device and the first access network device.

In another possible design, the first message includes information about a network resource, and the network resource is a resource used by the terminal device to request NPN onboarding.

In another possible design, the second message includes information indicating a requested onboarding NPN, and the information indicating the requested onboarding NPN includes at least one of the following: information about an identifier of a second network or third indication information. The information about the identifier of the second network is information about an identifier of the requested onboarding NPN, and the third indication information indicates a request for onboarding.

In another possible design, the second message includes information about an identifier of a second network and information about an identifier of a third network, the second network is a requested onboarding network, and the third network is an onboarded network. In this way, not only random access to a cell can be implemented, but also onboarding can be implemented.

In another possible design, the second message is used to request to access a first cell served by the first distributed unit. The first distributed unit verifies whether the terminal device has onboarded at least one NPN supported by the first cell; and if the terminal device has not onboarded the at least one NPN supported by the first cell, the first distributed unit determines that the terminal device requests to onboard the NPN supported by the first cell.

In another possible design, the second message includes information about an identifier of a second network. The first distributed unit verifies whether the second network is an onboarded network; and if the second network is not an onboarded network, the first distributed unit determines that the terminal device requests to onboard an NPN corresponding to the information about the identifier of the second network.

In another possible design, the terminal device sends the second message to the first distributed unit by using the network resource indicated by the first message. The first distributed unit determines, based on a network resource on which the second message is located, the onboarding NPN requested by the terminal device. Optionally, the second message is used by the terminal device to request to access the first cell served by the first distributed unit.

In another possible design, the first distributed unit sends a third message to the terminal device, where the third message indicates that NPN onboarding of the terminal device succeeds.

In another possible design, the third message includes information indicating a successfully onboarded NPN, and the information indicating the successfully onboarded NPN includes at least one of the following: information about an identifier of a fourth network or fourth indication information. The information about the identifier of the fourth network is information about an identifier of the successfully onboarded NPN, and the fourth indication information indicates that onboarding succeeds.

In another possible design, the first distributed unit sends a fourth message to the terminal device, where the fourth message indicates a cause value used by the first distributed unit to reject the request of the terminal device for NPN onboarding.

In another possible design, the first distributed unit receives a fifth message sent by a central unit, where the fifth message indicates a cause value used by the central unit to reject the request of the terminal device for NPN onboarding.

In another possible design, the first distributed unit sends a sixth message to the central unit, where the sixth message includes information indicating an onboarding NPN requested by the terminal device, and the information indicating the onboarding NPN requested by the terminal device includes at least one of the following: information about an identifier of a sixth network or seventh indication information.

In another possible design, the sixth message includes information about an identifier of a seventh network and information about an identifier of an eighth network, the seventh network is a requested onboarding network, and the eighth network is an onboarded network. In this way, not only random access to a cell can be implemented, but also onboarding can be implemented.

In another possible design, the sixth message is used to forward a layer 3 message to the central unit. The central unit verifies whether the terminal device has onboarded at least one NPN supported by the first cell; and if the terminal device has not onboarded the at least one NPN supported by the first cell, the central unit determines that the terminal device requests to onboard the NPN supported by the first cell. Optionally, the first cell is a cell that the terminal device camps on or accesses.

In another possible design, the sixth message includes information about an identifier of a ninth network. The central unit verifies whether the ninth network is an onboarded network; and if the ninth network is not an onboarded network, the central unit determines that the terminal device requests to onboard an NPN corresponding to the information about the identifier of the ninth network.

In another possible design, the first distributed unit sends a sixth message to the central unit by using a network resource used for NPN onboarding. The central unit determines, based on the network resource, the onboarding NPN requested by the terminal device.

In another possible design, the first distributed unit receives a seventh message sent by the central unit, where the seventh message indicates that NPN onboarding of the terminal device succeeds or indicates that onboarding of the terminal device fails.

In another possible design, the seventh message includes information indicating a successfully onboarded NPN, and the information indicating the successfully onboarded NPN includes at least one of following: information about an identifier of a fifth network or fifth indication information.

In another possible design, the seventh message includes sixth indication information, and the sixth indication information indicates whether the terminal device has an onboarding capability. This prevents subsequent malicious onboarding of the terminal device, and prevents the terminal device from continuously initiating requests for onboarding.

In another possible design, the first distributed unit receives an eighth message sent by the central unit, where the eighth message includes information indicating an onboarding NPN supported by the central unit and/or information indicate indicating an onboarding NPN supported by the second distributed unit.

In another possible design, the first distributed unit sends a ninth message to the central unit, where the ninth message includes information indicating a supported onboarding NPN, and the information indicating the supported onboarding NPN includes at least one of the following: information about an identifier of a tenth network or eighth indication information.

In another possible design, the information about the identifier of the first network includes at least one of the following: a public land mobile network identifier PLMN ID, a network identifier NID, a closed access group identifier CAG ID, or a human readable network identifier HRNN.

According to a fifth aspect, an embodiment of this application provides a communication method, including: A terminal device receives a first message sent by a first distributed unit, where the first message indicates that a cell served by the first distributed unit supports NPN onboarding and/or a cell served by a second distributed unit supports NPN onboarding; and sends a second message to the first distributed unit, where the second message indicates that the terminal device requests NPN onboarding. The first distributed unit indicates a supported onboarding NPN to the terminal device, and the terminal device may request NPN onboarding, so that the terminal device and a network side can dynamically update information about an NPN that is onboarded by the terminal device, and the terminal device can flexibly access an NPN that is not onboarded by the terminal device. In this way, communication efficiency is improved.

In another possible design, the first message includes information indicating a supported onboarding NPN, and the information indicating the supported onboarding NPN includes at least one of the following: information about an identifier of a first network and first indication information.

In another possible design, the first message includes second indication information, and the second indication information indicates whether a cell in which the terminal device is located supports assisting a second cell in NPN onboarding. Optionally, the second cell is a neighboring cell of the cell in which the terminal device is located.

In another possible design, the first message includes information about a network resource, and the network resource is a resource used by the terminal device to request NPN onboarding.

In another possible design, the second message includes information indicating a requested onboarding NPN, and the information indicating the requested onboarding NPN includes at least one of the following: information about an identifier of a second network or third indication information.

In another possible design, the second message includes information about an identifier of a second network and information about an identifier of a third network, the second network is a requested onboarding network, and the third network is an onboarded network.

In another possible design, the terminal device sends the second message to the first distributed unit by using the network resource indicated by the first message. The first distributed unit determines, based on a network resource on which the second message is located, the onboarding NPN requested by the terminal device. Optionally, the second message is used by the terminal device to request to access a first cell served by the first distributed unit.

In another possible design, the terminal device receives a third message sent by the first distributed unit, where the third message indicates that NPN onboarding of the terminal device succeeds.

In another possible design, the third message includes information indicating a successfully onboarded NPN, and the information indicating the successfully onboarded NPN includes at least one of the following: information about an identifier of a fourth network or fourth indication information.

In another possible design, the terminal device receives a fourth message sent by the first distributed unit, where the fourth message indicates a cause value used by the first distributed unit to reject the request of the terminal device for NPN onboarding.

According to a sixth aspect, an embodiment of this application provides a communication method, including: A central unit receives a first message sent by a second distributed unit, where the first message indicates that the second distributed unit supports NPN onboarding; and sends a second message to a first distributed unit, where the second message indicates that the central unit supports NPN onboarding. An onboarding NPN supported by the second distributed unit is indicated to the first distributed unit, so that the first distributed unit can assist a cell served by the second distributed unit in onboarding, to reduce signaling overheads.

In a possible design, the first message includes information indicating a supported onboarding NPN, and the information indicating the supported onboarding NPN includes at least one of the following: information about an identifier of a first network or first indication information.

In another possible design, the second message includes information indicating a supported onboarding NPN, and the information indicating the supported onboarding NPN includes at least one of the following: information about an identifier of a second network or second indication information.

In another possible design, the central unit receives a third message sent by the first distributed unit, where the third message indicates that a terminal device requests NPN onboarding; and sends a fourth message to the first distributed unit, where the fourth message indicates that NPN onboarding of the terminal device succeeds.

In another possible design, the third message includes information indicating a requested onboarding NPN, and the information indicating the requested onboarding NPN includes at least one of the following: information about an identifier of a third network or third indication information.

In another possible design, the fourth message includes information indicating a successfully onboarded NPN, and the information indicating the successfully onboarded NPN includes at least one of the following: information about an identifier of a fourth network or fourth indication information.

In another possible design, the central unit sends a fifth message to the first distributed unit, where the fifth message indicates a cause value used by the central unit to reject the request of the terminal device for NPN onboarding.

In another possible design, the central unit sends a sixth message to a core network device, where the sixth message indicates the onboarding NPN requested by the terminal device. The central unit receives a seventh message sent by the core network device, where the seventh message indicates that NPN onboarding of the terminal device succeeds or indicates that onboarding of the terminal device fails.

In another possible design, the sixth message includes information indicating a requested onboarding NPN, and the information indicating the requested onboarding NPN includes at least one of the following: information about an identifier of a fifth network or fifth indication information.

In another possible design, the seventh message includes information indicating a successfully onboarded NPN, and the information indicating the successfully onboarded NPN includes at least one of the following: information about an identifier of a sixth network or sixth indication information.

In another possible design, the seventh message includes seventh indication information, and the seventh indication information indicates whether the terminal device has an onboarding capability. This prevents subsequent malicious onboarding of the terminal device, and prevents the terminal device from continuously initiating requests for onboarding.

According to a seventh aspect, an embodiment of this application provides a communication method, including: A core network device receives a first message sent by a central unit, where the first message indicates that a terminal device requests NPN onboarding; and sends a second message to the central unit, where the second message indicates that NPN onboarding of the terminal device succeeds. The central unit indicates a requested onboarding NPN to the core network device, and the core network device indicates an NPN successfully onboarded by the terminal device, so that the terminal device and a network side can dynamically update information about an NPN that is onboarded by the terminal device, and the terminal device can flexibly access an NPN that is not onboarded by the terminal device. In this way, communication efficiency is improved.

In a possible design, the first message includes information indicating a supported onboarding NPN, and the information indicating the supported onboarding NPN includes at least one of the following: information about an identifier of a first network or first indication information.

In another possible design, the first message is used to forward a layer 3 message to the core network device. The core network device verifies whether the terminal device has onboarded at least one NPN supported by a first cell; and if the terminal device has not onboarded the at least one NPN supported by the first cell, the core network device determines that the terminal device requests to onboard the NPN supported by the first cell. The first cell is a cell that the terminal device camps on or accesses.

In another possible design, the first message includes information about an identifier of a first network. The core network device verifies whether the first network is an onboarded network; and if the first network is not an onboarded network, the core network device determines that the terminal device requests to onboard an NPN corresponding to the information about the identifier of the first network.

In another possible design, the second message includes information indicating a successfully onboarded NPN, and the information indicating the successfully onboarded NPN includes at least one of the following: information about an identifier of a second network or second indication information.

In another possible design, the core network device sends a third message to the central unit, where the third message indicates that the core network device supports NPN onboarding.

According to an eighth aspect, an embodiment of this application provides a communication apparatus. The communication apparatus is configured to implement the method and the function that are performed in any one of the foregoing aspects, and is implemented by hardware/software. The hardware/software of the communication apparatus includes a module corresponding to the foregoing function.

According to a ninth aspect, an embodiment of this application provides a first access network device, including a processor, a memory, and a communication bus. The communication bus is configured to implement a connection and communication between the processor and the memory, and the processor executes a program stored in the memory to implement the steps in the communication method provided in the first aspect.

According to a tenth aspect, an embodiment of this application provides a terminal device, including a processor, a memory, and a communication bus. The communication bus is configured to implement a connection and communication between the processor and the memory, and the processor executes a program stored in the memory to implement the steps in the communication method provided in the second aspect and the fifth aspect.

According to an eleventh aspect, an embodiment of this application provides a core network device, including a processor, a memory, and a communication bus. The communication bus is configured to implement a connection and communication between the processor and the memory, and the processor executes a program stored in the memory to implement the steps in the communication method provided in the third aspect and the seventh aspect.

According to a twelfth aspect, an embodiment of this application provides a first distributed unit, including a processor, a memory, and a communication bus. The communication bus is configured to implement a connection and communication between the processor and the memory, and the processor executes a program stored in the memory to implement the steps in the communication method provided in the fourth aspect.

According to a thirteenth aspect, an embodiment of this application provides a central unit, including a processor, a memory, and a communication bus. The communication bus is configured to implement a connection and communication between the processor and the memory, and the processor executes a program stored in the memory to implement the steps in the communication method provided in the sixth aspect.

According to a fourteenth aspect, this application provides a computer-readable storage medium, and the computer-readable storage medium stores instructions. When the instructions are run on a computer, the computer is enabled to perform the method in the foregoing aspects.

According to a fifteenth aspect, this application provides a computer program product including instructions, and when the instructions are run on a computer, the computer is enabled to perform the method in the foregoing aspects.

BRIEF DESCRIPTION OF DRAWINGS

To describe technical solutions in embodiments of this application or in the background more clearly, the following describes the accompanying drawings for describing embodiments of this application or the background.

DESCRIPTION OF EMBODIMENTS

The following describes embodiments of this application with reference to the accompanying drawings in embodiments of this application.

3GPP defines two NPN deployment modes: a standalone non-public network (stand-alone non-public networks, SNPN) and a non-standalone non-public network (non-stand-al one NPN).

Figure 1:
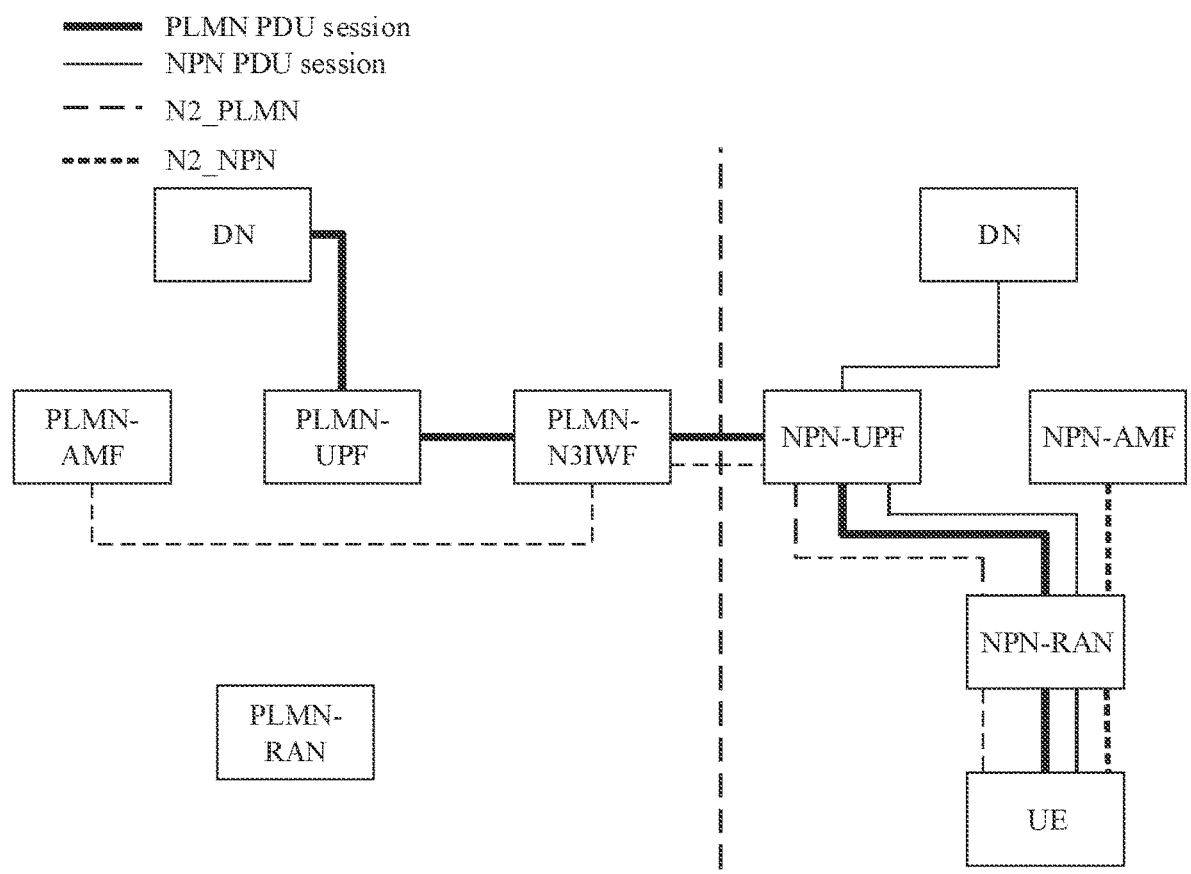
FIG. 1 is a schematic diagram of an SNPN according to an embodiment of this application.

FIG. 1 is a schematic diagram of an SNPN according to an embodiment of this application. A public land mobile network (public land mobile network, PLMN) includes network elements such as a data network (data network, DN), a PLMN user plane management function (user plane function, UPF) entity, a PLMN access and mobility management function (access and mobility management function, AMF) entity, a non-3GPP interworking function (Non-3GPP interworking function, N3IWF) network element, and a PLMN radio access network device (radio access network, RAN). The SNPN includes network elements such as an NPN-UPF entity, an NPN-AMF entity, a DN, and an NPN-RAN. The SNPN and the PLMN have independent core networks. The core networks of the SNPN and the PLMN are connected through the N3IWF network element, and interworking between a user plane and a control plane may be implemented through the N3IWF network element. The SNPN may be identified by a PLMN ID (identifier) and a network identifier (network identifier, NID). The ID may be allocated globally or locally.

A parameter broadcast by a cell in a RAN of an SNPN may include at least one of the following: one or more PLMN IDs, one or more NIDs corresponding to each PLMN ID, a human readable network name (human readable network name, HRNN), an indication that supports manual network selection by a user, or an indication that forbids access of another user equipment (user equipment, UE) that does not support the SNPN. After the UE registers with the SNPN and sets up a protocol data unit (protocol data unit, PDU) session, the UE may set up a network protocol security (internet protocol security, IPsec) tunnel by using a user plane of the PDU session in the SNPN, connect to the N3IWF in the PLMN, and register with the PLMN through the IPsec tunnel. Vice versa. In this interworking manner, an architecture and a mechanism in which the UE accesses a 5G core (5G Core) network by using an untrusted non-3GPP.

Figure 2:
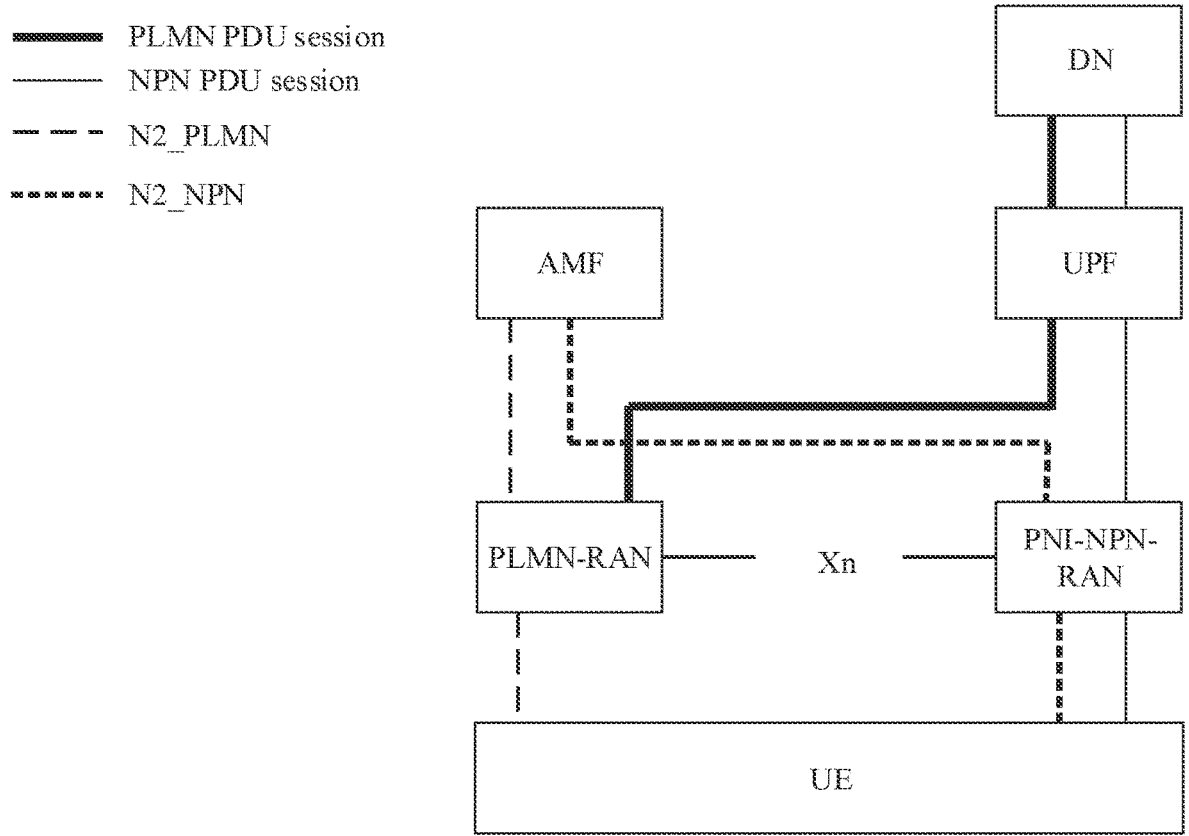
FIG. 2 is a schematic diagram of a non-standalone NPN according to an embodiment of this application.

FIG. 2 is a schematic diagram of a non-standalone NPN according to an embodiment of this application. The non-standalone NPN is also referred to as a public network integrated NPN (public network integrated NPN, PNI-NPN). The NPN and a PLMN may share a core network (for example, an AMF or a UPF). A PLMN-RAN may be deployed in the PLMN, and a PNI-NPN-RAN may be deployed in the NPN. The PLMN-RAN and the PNI-NPN-RAN may be connected to each other through an Xn interface. Optionally, the PLMN and the PNI-NPN may alternatively share one RAN. The NPN is deployed depending on the PLMN, and a PLMN ID may be used to identify the PNI-NPN network. The NPN may be a specific slice in the PLMN, and UE has subscription data of the PLMN. According to an agreement between a mobile operator and an NPN service provider, the NPN may be deployed only in a range of some tracking areas (tracing areas, TAs). When the UE moves out of the TA range, it may be indicated that the UE cannot continue to use a current slice resource in a new registration area. To prevent unauthorized UE from accessing a cell in which the PNI-NPN is located, a standard protocol defines a closed access group (closed access group, CAG), and the CAG is identified by a closed access group identifier (closed access group identifier, CAG ED). One CAG corresponds to one group of users who can access a CAG cell (PNI-NPN cell).

In non-standalone networking, the PNI-NPN may be deployed with support of a public network, and the PNI-NPN cell needs to broadcast not only a cell identifier but also the CAG ID. The CAG ID is used to identify one group of users who are allowed to access one or more cells associated with the CAG. One PNI-NPN cell may broadcast one or more CAG IDs, and may further broadcast an HRNN corresponding to the CAG ID. The CAG ID and the HRNN are provided to the user for manual selection. For ease of description, at least one of the PLMN ID, the CAG ID, or the HRNN may be collectively referred to as information about an identifier of the PNI-NPN.

It may be learned that only authorized users are allowed to access an SNPN cell and the PNI-NPN cell. For the PNI-NPN network, the PNI-NPN cell broadcasts, in system information, information about an identifier of a PNI-NPN that the PNI-NPN cell supports to access. The terminal device locally stores information about an identifier of a PNI-NPN that the terminal device subscribes to. After receiving the system information broadcast by the cell, the terminal device compares the information about the identifier of the PNI-NPN that the cell supports to access with the locally stored information about the identifier of the subscribed PNI-NPN, and if there is a PNI-NPN that is allowed to access, the terminal device may access a corresponding cell. The terminal device may report, to the RAN or the AMF by using non-access stratum (non-access stratum, NAS) or access stratum (access stratum, AS) information, information about an identifier of a PNI-NPN that is selected for access. The AMF also stores subscription information of the terminal device, for example, stores an allowed CAG list (allowed CAG list) of the terminal device. The AMF determines, based on the stored subscription information of the terminal device, whether to allow access of the terminal. For example, if the information (CAG ID) that is reported by the terminal device and that is about the identifier of the network selected for access is not in the allowed CAG list that is of the terminal device and that is stored in the AMF, the AMF rejects access of the terminal device. If the CAG ID that is reported by the terminal device and that is supported by the cell selected for access does not exist in the allowed CAG list that is of the terminal device and that is stored in the AMF, the AMF rejects access of the terminal device.

For the SNPN network, the terminal device and the AMF also store the subscription information of the terminal device, and the SNPN cell also broadcasts information about an identifier of an SNPN that the SNPN cell supports to access. The terminal device selects an access cell, and the AMF determines whether to allow access of the terminal device. An execution process is similar to that of the foregoing PNI-NPN, and details are not described herein again.

In conclusion, subscription information of the NPN is stored in the terminal device locally and in the AMF, and the terminal device can successfully access a network only when information about an identifier of the network selected by the terminal device for access is in the subscription information. In an existing standard, a terminal device cannot access an NPN that is not onboarded by the terminal device, affecting communication efficiency.

Figure 3:
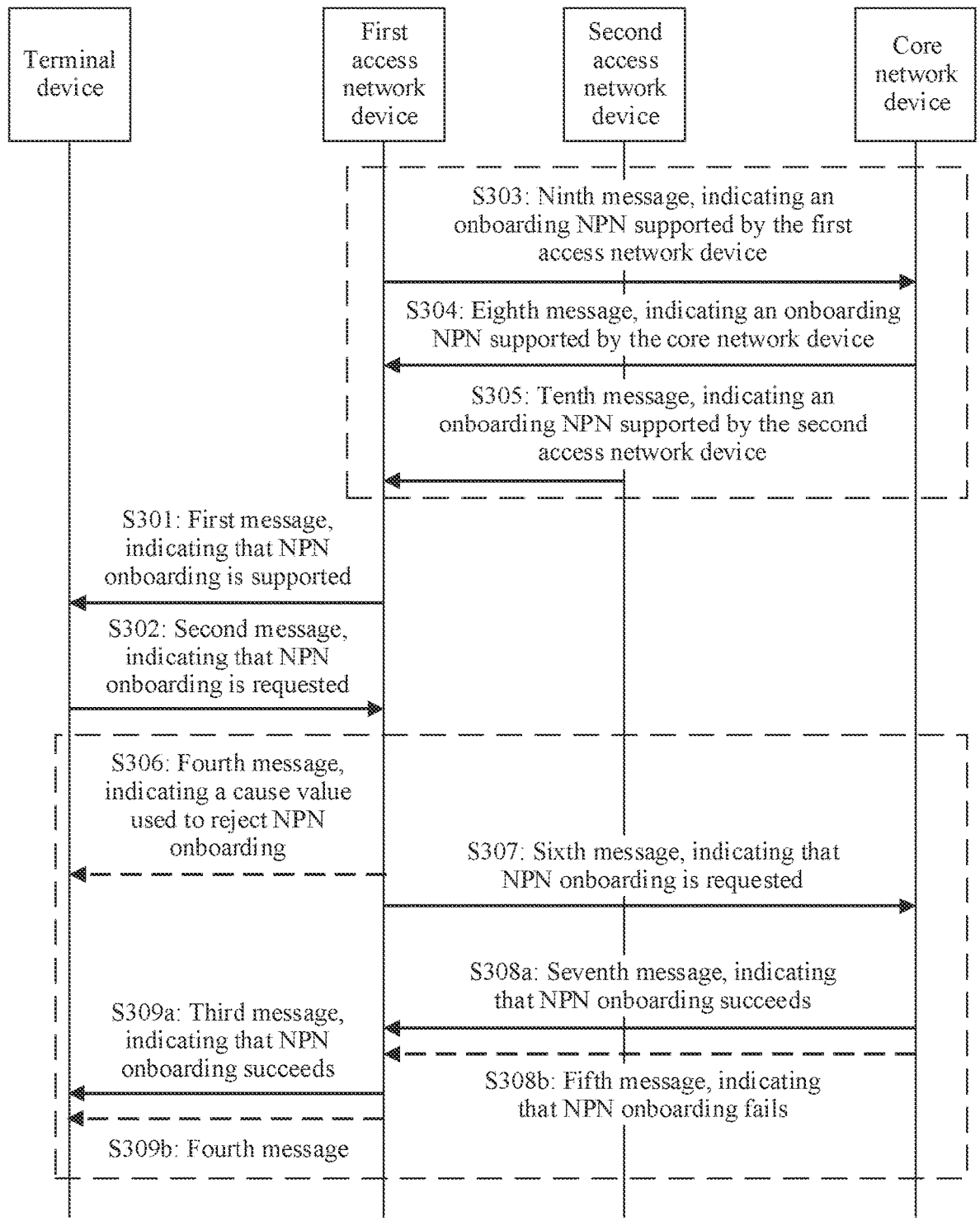
FIG. 3 is a schematic flowchart of a communication method according to an embodiment of this application.

FIG. 3 is a schematic flowchart of a communication method according to an embodiment of this application. The method includes but is not limited to the following steps.

S301: A first access network device sends a first message to a terminal device, where the first message indicates that a cell served by the first access network device supports NPN onboarding. The first access network device may be a next generation radio access network (next generation radio access network, NG RAN) device.

During specific implementation, the first access network device may send the first message to the terminal device by using a master information block (master information block, MIB), a system information block (system information block, SIB), radio resource control (radio resource control, RRC) signaling, a media access control (media access control, MAC) control element (control element, CE), NAS information, downlink control information (downlink control information, DCI), or user plane data information.

The first message includes information indicating a supported onboarding NPN. The information indicating the supported onboarding NPN includes at least one of the following: information about an identifier of a first network or first indication information. The first indication information may indicate that an NPN corresponding to NPN information supports or does not support onboarding, or indicate that an NPN corresponding to NPN information broadcast by the cell served by the first access network device supports or does not support onboarding. For example, the information about the identifier of the first network indicates that an NPN corresponding to the information about the identifier of the first network supports onboarding. When the first message includes the first indication information, the first indication information may indicate that all NPNs corresponding to NPN information broadcast by the cell support onboarding. The first message may alternatively include the information about the identifier of the first network and the first indication information. Optionally, one or more identifiers correspond to one piece of first indication information, and the first indication information indicates whether one or more NPNs corresponding to the one or more identifiers support onboarding. The information about the identifier of the first network may include at least one of the following: a PLMN ID, an NID, a CAG ID, or an HRNN. The first network is the supported onboarding NPN.

Optionally, the onboarding NPN supported by the cell may be different from an NPN supported by the cell, and the onboarding NPN supported by the cell may be or may not be the NPN supported by the cell. The NPN supported by the cell allows the terminal device to perform conventional access, and may provide a normal NPN service for the terminal device. The onboarding NPN supported by the cell may not provide a normal NPN service for the terminal device. For example, NPNs supported by the cell may be an NPN #1 and an NPN #2, and onboarding NPNs supported by the cell may be the NPN #1 and the NPN #2, the NPN #2 and an NPN #3, or an NPN #3 and an NPN #4. Alternatively, the onboarding NPN supported by the cell may be the NPN #1 or the NPN #2. When a corresponding NPN supports only onboarding, for example, the foregoing NPN #3 and NPN #4, the terminal device can onboard the NPN through the cell, but cannot obtain a normal NPN service through the cell. After performing onboarding through the cell successfully, the terminal device may need to reselect another cell to obtain a corresponding normal NPN service. For example, in cell system information, a CAG ID #1 and/or an NID #1 supported by each PLMN ID may be broadcast, and/or an onboarding CAG ID #2 and/or an onboarding NID #2 that are/is supported by the PLMN ID may be broadcast. For example, in system information of a CAG cell or an NID cell, a CAG ID #1 and/or an NID #1 supported by the cell may be broadcast, and/or an onboarding CAG ID #2 and/or an onboarding NID #2 that are/is supported by the cell may be broadcast. The onboarding NPN supported by the cell may or may not be used only for NPN onboarding. Optionally, the foregoing information is broadcast in a SIB 1 of a cell. For example, the foregoing information is broadcast in an information element of cell access related information (cellAccessRelatedlnfo), a PLMN identity information list (PLMN-IdentitylnfoList), an NPN identity information list (NPN-IdentitylnfoList), PLMN identity information (PLMN-Identitylnfo), PNI-NPN identity information (PNI-NPN-Identitylnfo), or SNPN identity information (SNPN-Identitylnfo) of the SIB 1.

Optionally, the first indication information indicates that the corresponding NPN supports or does not support only onboarding, or indicates that the NPN broadcast by the cell served by the first access network device supports or does not support only onboarding. For example, when the first indication information indicates that the corresponding NPN supports only onboarding, it indicates that the access network device or the cell supports only onboarding the corresponding NPN, but cannot provide a corresponding normal NPN service for the terminal device. Consequently, a terminal device having subscription information of the corresponding NPN cannot access the cell to obtain a normal NPN service. After performing onboarding through the cell successfully, the terminal device needs to reselect another cell to obtain a corresponding normal NPN service.

Optionally, the information that is about the supported onboarding NPN and that is included in the first message may be indicated by information about an NPN broadcast in system information specified in the existing 3GPP standard, or may be information that is about an NPN and that is further independently added.

The first message may further include information about a network resource, and the network resource is a resource used by the terminal device to request NPN onboarding. The network resource may include at least one of the following resources: a random access channel (random access channel, RACH), a physical random access channel (physical random access channel, PRACH), a physical cell identifier (physical Cell ID, PCI), a cell radio network temporary identifier (cell radio network temporary identifier, C-RNTI), or the like. The network resource may be specifically allocated or reserved. A granularity of the network resource may be a cell, or may be an NPN. For example, a cell is used as a granularity, when the UE performs onboarding through the cell and accesses an access network device and/or a core network device by using the specifically allocated network resource, the access network device and/or the core network device may determine that the UE performing accessing by using the network resource aims to request onboarding. For another example, when an NPN is used as a granularity, the UE onboards an NPN through the cell and accesses a network by using the specifically allocated network resource, the network may determine that the UE performing accessing by using the network resource aims to request to onboard the NPN.

Optionally, the first message includes information about priorities for accessing different networks supported by the first access network device, so that the terminal device performs cell selection, cell reselection, network selection, network access, or the like based on the information. For example, for a first access network device that supports a public network and/or an NPN, a priority for accessing the public network and/or the NPN network supported by the first access network device or priorities for accessing different NPNs, SNPNs, PNI-NPNs, NIDs, or CAGs are broadcast in system information. For another example, for a first access network device that supports only a PNI-NPN, priorities for accessing different CAG cells or PNI-NPN cells supported by the first access network device are broadcast in system information. A CAG priority, a PLMN priority, an NID priority, and/or the like are/is configured in a cell, a PLMN, or a TA supported by the first access network device, so that based on this, the terminal device preferably selects to access one or some CAG cells, PNI-NPN cells, public network cells, SNPN cells, and/or the like. Optionally, the information about the priorities for accessing different networks supported by the first access network device may be configured by OAM or the core network device for the first access network device in an auxiliary manner and sent to the first access network device, or may be configured by the first access network device. Optionally, the system information may be the SIB 1.

Optionally, before the first access network device sends the first message to the terminal device, this embodiment of this application may further include the following step.

S303: The first access network device sends a ninth message to the core network device, where the ninth message includes information indicating an onboarding NPN supported by the first access network device, and the information indicating the supported onboarding NPN includes at least one of the following: information about an identifier of the NPN or indication information. For the ninth message, refer to the description of the eighth message. Details are not described herein.

Optionally, the onboarding NPN supported by the first access network device may be different from an NPN supported by the first access network device. The onboarding NPN supported by the first access network device may be the NPN supported by the first access network device, or may not be the NPN supported by the first access network device.

Optionally, the ninth message may be the eighth message, and may be an NG interface setup request (NG setup request), a RAN configuration update (RAN configuration update) message, an AMF configuration update acknowledgment (AMF configuration update acknowledgment) message, or the like.

Optionally, the ninth message includes the information about the priorities for accessing different networks supported by the first access network device, so that an AMF performs access control, resource scheduling, and the like based on the information. For example, for a first access network device that supports a public network and/or an NPN, the ninth message includes a priority for accessing the public network and/or the NPN network supported by the first access network device or priorities for accessing different NPNs, SNPNs, PNI-NPNs, NCDs, or CAGs supported by the first access network device. For another example, for a first access network device that supports only a PNI-NPN cell, the ninth message includes priorities for accessing different CAGs or PNI-NPNs supported by the first access network device. A CAG priority, a PLMN priority, an NID priority, and/or the like are/is configured in a cell, a PLMN, or a TA supported by the first access network device, to indicate that the AMF may preferentially schedule a resource and the like in one or some CAGs, PNI-NPNs, public networks, and/or SNPNs. Optionally, the information about the priorities for accessing different networks supported by the first access network device may be configured by the OAM or the core network device for the first access network device in an auxiliary manner and sent to the first access network device, or may be configured by the first access network device.

Optionally, before the first access network device sends the first message to the terminal device, this embodiment of this application may further include the following step.

S304: The first access network device receives an eighth message sent by the core network device. The eighth message indicates an onboarding NPN supported by the core network device. The core network device may be an AMF entity or an operation administration and maintenance (operation administration and maintenance, OAM) entity.

Optionally, the eighth message may be an NG interface setup response (NG setup response), an AMF configuration update (AMF configuration update) message, a RAN configuration update acknowledgment (RAN configuration update acknowledge) message, or the like. The eighth message includes information indicating the onboarding NPN supported by the core network device, and the information indicating the onboarding NPN supported by the core network device includes at least one of the following: information about an identifier of the NPN or indication information. The indication information may indicate whether a corresponding NPN configured by the core network device supports onboarding or indicate whether an NPN broadcast by a cell supports onboarding. The information about the identifier of the NPN may include at least one of the following: a PLMN ID, an NID, a CAG ID, or an HRNN. A function of the information about the identifier of the NPN or the indication information are similar to that of the information about the identifier of the first network or the first indication information in step S301, and details are not described herein again.

Optionally, the information indicating that the onboarding NPN supported by the core network device may indicate information about an onboarding NPN supported by one or more TAs or PLMNs supported by a core network.

Optionally, the core network device may notify, by using the eighth message, the first access network device of the onboarding NPN supported by the core network device, so that the first access network device selects or routes the core network device when subsequently receiving an onboarding NPN of the terminal device.

Optionally, the onboarding NPN supported by the core network device may be different from an NPN supported by the core network device. The onboarding NPN supported by the core network device may be the NPN supported by the core network device, or may not be the NPN supported by the core network device. For example, the core network device may assist another core network device or a third-party provider that supports some NPNs in NPN onboarding.

Optionally, the eighth message includes information about priorities for accessing different networks supported by the core network device, so that the first access network device performs access control, resource scheduling, and the like based on the information. For example, for a core network device that supports a public network and/or an NPN, the eighth message includes a priority for accessing the public network and/or the NPN network supported by the core network device or priorities for accessing different NPNs, PNI-NPNs, SNPNs, NIDs, or CAGs supported by the core network device. For another example, for a core network device that supports only a PNI-NPN cell, the eighth message includes priorities for accessing different CAGs or PNI-NPNs supported by the core network device. A CAG priority, a PLMN priority, an NID priority, and/or the like are/is configured in a cell, a PLMN, or a TA supported by the core network device, so that based on this, the first access network device preferably schedules a resource and the like in one or some CAG cells, PNI-NPN cells, public network cells, and/or SNPN cells. Optionally, the information about the priorities for accessing different networks supported by the core network device may be configured by the OAM or the first access network device for the core network device in an auxiliary manner and sent to the core network device, or may be configured by the core network device.

Optionally, after the first access network device receives the eighth message sent by the core network device, the first message may indicate that the cell served by the first access network device supports NPN onboarding, or may indicate the onboarding NPN supported by the core network device.

The first access network device may first send the ninth message to the core network device, and after receiving the ninth message, the core network device sends the eighth message to the first access network device.

Optionally, before the first access network device sends the first message to the terminal device, this embodiment of this application may further include the following step.

S305: The first access network device receives a tenth message sent by a second access network device, where the tenth message indicates an onboarding NPN supported by a cell served by the second access network device.

The tenth message may be an Xn setup request (Xn setup request) message, an Xn setup response (Xn setup response) message, a next generation radio access network node configuration update (NG-RAN node configuration update) message, a next generation radio access network node configuration update acknowledgment (NG-RAN node configuration update acknowledge) message, a handover request (handover request) message, a handover request acknowledgment (handover request acknowledge) message, a handover preparation failure (handover preparation failure), or the like. The tenth message may include information indicating the onboarding NPN supported by the cell served by the second access network device. Optionally, the information indicating the onboarding NPN supported by the cell served by the second access network device may be carried in an information element of NR served cell information (served cell information NR), E-UTRA served cell information (served cell information E-UTRA), NR neighboring cell information (neighbor cell information NR), or E-UTRA neighboring cell information (neighbor cell information E-UTRA) in the Xn setup request message, or an information element of a mobility restriction list (mobility restriction list) in the handover request message. The information indicating the onboarding NPN supported by the cell served by the second access network device may include information about an identifier of the NPN and indication information. The indication information may indicate whether a corresponding NPN network supports onboarding or indicate whether an NPN broadcast by the cell served by the second access network device supports onboarding. The information about the identifier of the NPN may include at least one of the following: a PLMN ID, an NID, a CAG ID, or an HRNN. A function of the information about the identifier of the NPN or the indication information are similar to that of the information about the identifier of the first network or the first indication information in step S301, and details are not described herein again.

Optionally, after the first access network device receives the tenth message sent by the second access network device, the first message may indicate that the cell served by the first access network device supports NPN onboarding, or may indicate the onboarding NPN supported by the cell served by the second access network device.

Optionally, as shown in Table 1, the information indicating the onboarding NPN supported by the cell served by the second access network device may indicate information about an onboarding NPN supported by one or more cells served by the second access network device, for example, information about an onboarding NPN supported by a cell that is included in one or more TAs or PLMNs and that is served by the second access network device.

Optionally, the tenth message indicates an onboarding NPN supported by the second access network device. Information indicating the onboarding NPN supported by the second access network device may indicate information about an onboarding NPN supported by the second access network device in one or more TAs or PLMNs.

Optionally, the tenth message includes information about priorities for accessing different networks supported by the second access network device, so that the first access network device performs access control, resource scheduling, and the like based on the information. For example, for a second access network device that supports a public network and/or an NPN, the tenth message includes a priority for accessing the public network and/or the NPN network supported by the second access network device or priorities for accessing different NPNs, PNI-NPNs, SNPNs, NIDs, or CAGs supported by the second access network device. For another example, for a second access network device that supports only a PNI-NPN cell, the tenth message includes priorities for accessing different CAGs supported by the second access network device. A CAG priority, a PLMN priority, an NID priority, and/or the like are/is configured in a cell, a PLMN, or a TA supported by the second access network device, so that based on this, the first access network device preferably schedules or hands over the terminal device to one or some CAG cells, PNI-NPN cells, public network cells, and/or SNPN cells served by the second access network device. Optionally, the information about the priorities for accessing different networks supported by the second access network device may be configured by the OAM, the core network device, or the first access network device for the second access network device in an auxiliary manner and sent to the second access network device, or may be configured by the second access network device.

Optionally, the first message may include indication information, and the indication information indicates whether a cell in which the terminal device is located supports assisting a neighboring cell in NPN onboarding. The neighboring cell may be a cell served by the second access network device or a cell served by the first access network device other than the cell in which the terminal device is located. The cell in which the terminal device is located sends, to the terminal device, a message for supporting the neighboring cell in NPN onboarding, to indicate that the neighboring cell may be assisted in NPN onboarding. In this way, the terminal device can onboard, in one cell, NPNs supported by a plurality of cells, to reduce signaling overheads of NPN onboarding between the terminal device and the first access network device.

S302: The terminal device sends a second message to the first access network device, where the second message indicates that the terminal device requests NPN onboarding.

Specifically, the terminal device may send the second message to the first access network device by using RRC, a MAC CE, NAS information, uplink control information (uplink control information, UCI), or user plane data information. The second message may be a random access message (message 1, MSG), an RRC setup request (RRC setup request), an RRC setup complete (RRC setup complete) message, an RRC resume (RRC resume request) message, an RRC resume complete (RRC resume complete) message, an uplink information transfer (UL information transfer) message, an RRC reestablishment request (RRC reestablishment request), RRC reestablishment complete (RRC reestablishment complete), UE capability information (UE capability information), or the like. The second message includes information indicating a requested onboarding NPN, and the information indicating the requested onboarding NPN includes at least one of the following: information about an identifier of a second network or second indication information. The second network is the requested onboarding NPN, and an indication manner of the information about the identifier of the second network or the second indication information is similar to the indication manner of the information about the identifier of the first network or the first indication information in step S301. Details are not described herein again.

Optionally, the information about the identifier of the second network may be the same as the information about the identifier of the first network.

Optionally, the second message includes indication information, and the indication information is used to notify the first access network device that the terminal device requests NPN network onboarding.

Optionally, the second message includes indication information, and the indication information is used to notify the first access network device whether the terminal device has an NPN network onboarding capability. Optionally, the second message includes indication information, and the indication information is used to notify the first access network device whether the terminal device supports a proximity indication (proximity indication) information function of an NPN cell. The proximity indication function of the NPN cell includes but is not limited to at least one of the following: a proximity indication information function of the CAG or a proximity indication information function of the NID. The proximity indication information includes one or more of the following information: indication information indicating that the terminal device is entering a neighboring area of one or more CAG cells or NID cells, indication information indicating that the terminal device is leaving the neighboring area of the one or more CAG cells or NID cells, indication information indicating that the terminal device is entering the one or more CAG cells or NID cells, or indication information indicating that the terminal device is leaving the one or more CAG cells or NID cells. For example, character strings entering and leaving are used to indicate entering and leaving respectively, and an absolute radio frequency channel number (absolute radio frequency channel Number—ARFCN) of a cell is used to identify the cell, or a cell ID is used to identify the cell. The proximity indication information function of the CAG and the proximity indication information function of the NID each may further include but are not limited to at least one of the following: an intra-frequency proximity indication (intraFreq proximity indication) function, an inter-frequency proximity indication (interFreq proximity indication) function, or an inter-RAT (UTRAN or E-UTRAN) proximity indication (UTRAN or E-UTRAN-ProximityIndication) function. The intra-frequency proximity indication function of the CAG indicates whether the UE supports executing the proximity indication function for intra-frequency CAG cells in an allowed CAG list of the UE. The inter-frequency proximity indication function of the CAG indicates whether the UE supports executing the proximity indication function for inter-frequency CAG cells in the allowed CAG list of the UE. The inter-RAT (UTRAN or E-UTRAN) proximity indication function of the CAG indicates whether the UE supports executing the proximity indication function for inter-RAT (UTRAN or E-UTRAN) CAG cells in the allowed CAG list of the UE. Similarly, the infra-frequency proximity indication function of the NID indicates whether the UE supports executing the proximity indication function for an NID cell accessed by the UE or for infra-frequency NID cells in an allowed NID list of the UE. The inter-frequency proximity indication function of the NID indicates whether the UE supports executing the proximity indication function for the NID cell accessed by the UE or for inter-frequency NID cells in the allowed NID list of the UE. The inter-RAT (UTRAN or E-UTRAN) proximity indication function of the NID indicates whether the UE supports executing the proximity indication function for the NID cell accessed by the UE or for inter-RAT (UTRAN or E-UTRAN) NID cells in the allowed NID list of the UE. Optionally, the terminal device may alternatively have a proximity indication function for one or more CAG cells or NID cells, for example, a CAG cell or an NID cell that the UE currently accesses, a CAG cell or an NID cell that is onboarded by the UE, several specific CAGs or NIDs, or some of CAGs or NIDs reported by the UE. For example, the terminal device sends the foregoing information to the first access network device by using the UE capability information (UE capability information) message.

Optionally, in an RRC reestablishment or RRC resume process, the terminal device sends the RRC reestablishment request or the RRC resume request message to a target access network device, the target access network device sends a retrieve UE context request (retrieve UE context request) message to a source access network device, to obtain a context of the terminal device, and the source access network device compares locally stored context information of the terminal device with information about an NPN supported by a cell in which the terminal device is located and that is served by the target access network device. If the context information of the terminal device conflicts with the information about the NPN supported by the target cell, the source access network device sends a retrieve UE context failure (retrieve UE context failure) message to the target access network device, and the target access network device rejects RRC connection reestablishment or resume of the terminal device. If the context information of the terminal device does not conflict with the information about the NPN supported by the target cell, the source access network device sends a retrieve UE context response (retrieve UE context response) message to the target access network device, and the target access network device accepts RRC connection reestablishment or resume of the terminal device. The context information of the terminal device includes at least one of the following information: an allowed CAG list (allowed CAG list), a CAG-only indication (CAG-only indication), radio access technology restrictions (RAT Restrictions) included in a mobility restriction list (mobility restriction list), forbidden area information (forbidden area information), service area information (Service Area Information), or information about priorities for the terminal device to access different networks. The information about the NPN supported by the cell includes at least one of the following: a PLMN ID, an NID, a CAG ID, or an HRNN. For example, for a terminal device that can access only a CAG cell, if no CAG ID/PNI-NPN that is in the context information and that the terminal device is allowed to access is in a CAG ID/PNI-NPN information supported by the target cell, the source access network device sends a failure message to the target access network device. The source access network device may learn of, through an Xn interface setup process, the CAG ID/PNI-NPN information supported by the target cell. Optionally, in the foregoing process, the source access network device determines whether to accept RRC connection reestablishment or resume of the terminal device, or the target access network device may determine whether to accept RRC connection reestablishment or resume of the terminal device. For example, after receiving a UE context request (retrieve UE context request) message sent by the target access network device, the source access network device feeds back a UE context response (retrieve UE context response) message to the target access network device, where the UE context response message includes the context information of the terminal device. The target access network device compares the received context information of the terminal device with the information about the NPN supported by the cell in which the terminal device is located and that is served by the target access network device. If the context information of the terminal device conflicts with the information about the NPN supported by the target cell, the target access network device rejects RRC connection reestablishment or resume of the terminal device. If the context information of the terminal device does not conflict with the information about the NPN supported by the target cell, the target access network device accepts RRC connection reestablishment or resume of the terminal device, and sends RRC reestablishment (RRC reestablishment) or an RRC resume (RRC resume) message to the terminal device. It should be understood that the source access network device or the target access network device may be a central unit CU, for example, a CU shared by different networks.

Optionally, the terminal device may send the second message to the first access network device by using the specifically allocated or reserved network resource. A granularity of the network resource may be a cell, or may be an NPN. For example, a cell is used as a granularity, when the UE performs onboarding through an access cell and accesses a cell of a network by using the specifically allocated network resource, the network may determine that the UE performing accessing by using the network resource aims to request onboarding. For another example, an NPN is used as a granularity, when the UE onboards an NPN through the cell and accesses the access network device and/or the core network device by using the specifically allocated network resource, the access network device and/or the core network device may determine that the UE performing accessing by using the network resource aims to request to onboard the NPN.

Optionally, the second message includes information about an identifier of a second network and information about an identifier of a third network, the second network is a requested onboarding network, and the third network is an onboarded network. In this way, not only random access to a cell can be implemented, but also onboarding can be implemented. For example, the second message may include a list of identifiers of NPNs. A first identifier in the list is an onboarded identifier, and an identifier other than the first identifier in the list is an identifier of a requested onboarding NPN. Alternatively, a plurality of identifiers in the list are onboarded identifiers, and an identifier other than the plurality of identifiers in the list is an identifier of a requested onboarding NPN. Locations of the plurality of identifiers in the list are not fixed, and the plurality of identifiers may be one or more identifiers in the front of the list, one or more identifiers in the middle of the list, or one or more identifiers in the last of the list. For another example, both the information about the identifier of the second network and the information about the identifier of the third network are included in a NAS message in the second message; both the information about the identifier of the second network and the information about the identifier of the third network are included in an AS message in the second message; the information about the identifier of the second network is included in a NAS message in the second message but the information about the identifier of the third network is included in an AS message in the second message; or the information about the identifier of the second network is included in an AS message in the second message but the information about the identifier of the third network is included in a NAS message in the second message. For example, in the RRC setup complete (RRC setup complete) message, at least one of the following information elements is used to indicate the information about the identifier of the third network: a selected PLMN identity (selected PLMN-Identity), a selected network identity (selected Network-Identity), a selected NPN network identity (selected NPN-Identity), a selected NID (selected NID), a selected CAG identifier (selected CAG ID), a selected SNPN network identifier, or a selected PNI-NPN network identifier. In an AMF (registered AMF) with which the information element in the RRC setup complete (RRC setup complete) message is registered, at least one of the following information elements is used to indicate the information about the identifier of the second network: a PLMN identity (PLMN-Identity), an AMF identifier (AMF-Identifier), a network identifier (NID), a CAG identifier (CAG ID), an SNPN network identifier, or a PNI-NPN network identifier. Based on the information about the identifier of the third network, the first access network device performs normal access control on the terminal device and selects a core network device. Based on the information about the identifier of the second network, the first access network device performs onboarding control on the terminal device and selects a corresponding core network device to perform an onboarding process.

Optionally, the second message is used to request to access a first cell served by the first access network device. The first access network device verifies whether the terminal device has onboarded at least one NPN supported by the first cell; and if the terminal device has not onboarded the at least one NPN supported by the first cell, the first access network device determines that the terminal device requests to onboard the NPN supported by the first cell. If the terminal device has onboarded the at least one NPN supported by the first cell, the first access network device determines that onboarding of the terminal device succeeds. For example, the first cell may be a cell with a unique CAG or a cell with a unique SNPN.

Optionally, the second message includes information about an identifier of a second network. The first access network device verifies whether the second network is an onboarded network; and if the second network is not an onboarded network, the first access network device determines that the terminal device requests to onboard an NPN corresponding to the information about the identifier of the second network. If the second network is an onboarded network, the first access network device determines that onboarding of the terminal device succeeds.

Figure 4:
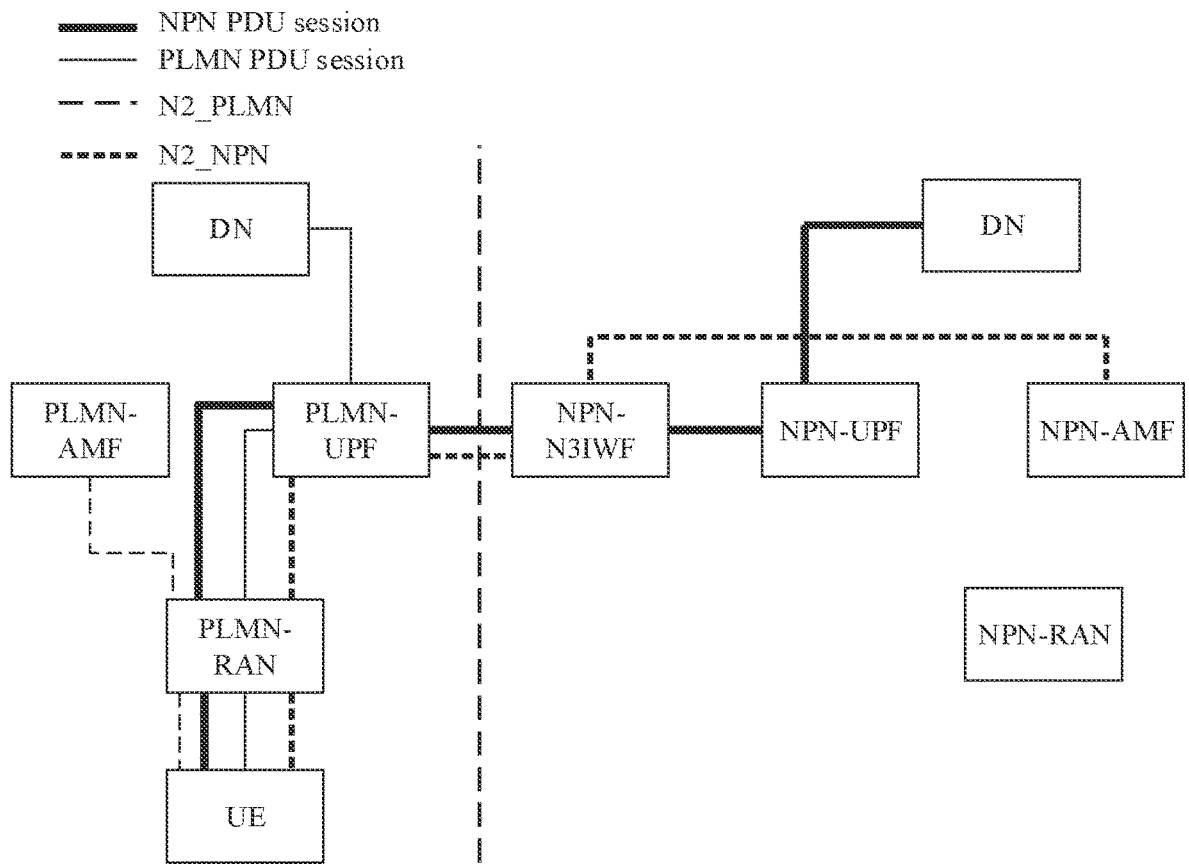
FIG. 4 is a schematic diagram of SNPN onboarding according to an embodiment of this application.

Optionally, the first message may include address information of an N3IWF entity, and the address information indicates that the terminal device requests NPN onboarding from the core network device through the N3IWF entity. It should be understood that the address information of the N3IWF entity may alternatively be sent by the first access network device to the terminal device by using the first message, or may be already stored by the terminal device. When the terminal device has stored the address information of the N3IWF entity, the first message does not need to include the address information of the N3IWF entity. The terminal device may set up an IPsec tunnel based on the address information of the N3IWF entity, and request NPN onboarding from the core network device by using the IPsec tunnel that is set up. The terminal device implements NPN onboarding by setting up the IPsec tunnel, to reduce signaling overheads. For example, FIG. 4 is a schematic diagram of SNPN onboarding according to an embodiment of this application. When the UE is in a PLMN RAN, there is no interface between the PLMN RAN and a core network of the SNPN for direct connection, and signaling exchange cannot be performed. The UE may set up a control plane connection and/or a user plane connection to the SNPN network by using an onboarded PLMN and/or an onboarded SNPN #1 (for example, set up a channel between a control plane and the AMF for NAS signaling transmission, and set up a PDU session resource on a user plane), and set up an IPsec tunnel to interact with the core network of the SNPN, the third-party provider, or a third-party device and onboard an SNPN #2. Optionally, the N3IWF entity may be another entity, for example, a third-party provider (service provider).

For another example, if an SNPN RAN is a shared RAN, there may be an Xn interface between the PLMN RAN and the SNPN RAN. The UE sends a request message to the PLMN RAN, where the request message indicates to request SNPN onboarding. The PLMN RAN sends the request message to the SNPN RAN through the Xn interface, then the SNPN RAN sends the request message to the SNPN AMF, and the AMF determines whether onboarding of the UE succeeds. The Xn interface between the PLMN RAN and the SNPN RAN is used for SNPN onboarding, to reduce signaling overheads.

Optionally, the information that needs to be sent when the terminal device requests NPN onboarding by using the second message from the first access network device may be included in non-access stratum (non-access stratum, NAS) or access stratum (access stratum, AS) information.

Optionally, after the first access network device receives the second message sent by the terminal device, this embodiment of this application may further include the following step.

S306: The first access network device determines an onboarding NPN requested by the terminal device. When determining that the onboarding NPN requested by the terminal device is not the onboarding NPN supported by the first access network device, not the onboarding NPN supported by the second access network device, or not the onboarding NPN supported by the core network device, the first access network device sends a fourth message to the terminal device, where the fourth message indicates a cause value used by the first access network device to reject the request of the terminal device for NPN onboarding. The cause value may be that the NPN requested by the terminal device is not supported, the CAG is not supported, the NID is not supported, the NPN is invalid (invalid), the CAG is invalid, the NID is invalid, the NID (NID not served by the CU or NID not supported by the CU) is not supported by the CU, the CAG ID (CAG ID not served by the CU or CAG not supported by the CU) is not supported by the CU, or the like.

Optionally, the fourth message may be an RRC reconfiguration (RRC reconfiguration) message, an RRC setup (RRC setup) message, an RRC resume (RRC resume) message, a downlink message transfer (DL information transfer) message, an RRC release (RRC release) message, a registration reject (registration reject) message, or an error indication (error indication) message.

Optionally, after the first access network device receives the second message sent by the terminal device, this embodiment of this application may further include the following step.

S307: The first access network device sends a sixth message to the core network device, where the sixth message indicates that the terminal device requests NPN onboarding.

Optionally, before the first access network device sends the sixth message, the first access network device may perform preliminary determining. For example, if the first access network device can sense an onboarding NPN requested by the terminal device, only when the onboarding NPN requested by the terminal device is the onboarding NPN supported by the first access network device, is the onboarding NPN supported by the second access network device, or is the onboarding NPN supported by the core network device, the first access network device can send the sixth message to the core network device.

The sixth message may be an initial UE message (initial UE message), an uplink NAS transport (uplink NAS transport) message, an initial context setup response (initial context setup response) message, or a UE context modification response (UE context modification response) message. NAS or AS information in the sixth message includes information indicating the requested onboarding NPN, and the information indicating the requested onboarding NPN includes at least one of the following: information about an identifier of a fifth network or fourth indication information. The information about the identifier of the fifth network may include at least one of the following: a PLMN ID, an NID, a CAG ID, or an HRNN. The fifth network is the requested onboarding NPN. An indication manner of the information about the identifier of the fifth network or the fourth indication information is similar to the indication manner of the information about the identifier of the first network or the first indication information in step S301. Details are not described herein again.

S308a: After receiving the sixth message sent by the first access network device, the core network device determines whether to accept onboarding of the terminal device. If onboarding is accepted, the core network device updates context or subscription information related to the terminal device, for example, updates the allowed CAG list (allowed CAG list) of the UE, the CAG-only indication (CAG-only indication), or the like. The core network device may send a seventh message to the first access network device, where the seventh message indicates that NPN onboarding of the terminal device succeeds.

The seventh message may be an initial context setup request (initial context setup request), a UE context modification request (UE context modification request), a downlink NAS transport (downlink NAS transport) message, or a registration accept (registration accept) message. The seventh message includes information indicating a successfully onboarded NPN, and the information indicating the successfully onboarded NPN includes at least one of the following: information about an identifier of a sixth network or fifth indication information. The sixth network is the successfully onboarded NPN.

Optionally, the context or subscription information of the terminal device in the seventh message includes information about priorities for the terminal device to access different networks. For example, for a terminal device that can access a public network and/or an NPN, the seventh message includes a priority for the terminal device to access the public network and/or the NPN network, or priorities for the terminal device to access different NPNs, PNI-NPNs, SNPNs, NIDs, or CAGs. For another example, for a terminal device that can access only a PNI-NPN cell, the seventh message includes priorities for the terminal device to access different CAGs or PNI-NPNs. A CAG priority, a PLMN priority, an NID priority, and/or the like are/is configured in the context or subscription information of the terminal device, for example, the mobility restriction list (mobility restriction list), so that when serving the terminal device based on this, the first access network device preferentially schedules a resource and the like in one or some CAG cells, PNI-NPN cells, public network cells, and/or SNPN cells served by the first access network device; or based on this, the first access network device preferentially schedules or hands over the terminal device to one or some CAG cells, PNI-NPN cells, public network cells, and/or SNPN cells served by another access network device. Optionally, the information about the priorities for the terminal device to access different networks may be configured by the core network device for the terminal device in an onboarding process, a registration process, or the like in an auxiliary manner and sent to the terminal device, or may be configured by the terminal device.

Optionally, the information about the priorities for the terminal device to access different networks may alternatively be included in an NG interface handover request (handover request) message, an Xn interface handover request (handover request), a secondary node addition request (s-node addition request), a secondary node modification request (s-node modification request), or a retrieve UE context response (retrieve UE context response) message, to exchange the context information of the terminal device with different network elements in different communication processes.

Optionally, after receiving the seventh message, the first access network device sends, to the terminal device by using the fourth message or the third message, the information that is about the priorities for the terminal device to access different networks and that is included in the NAS or AS information, so that the terminal device can preferentially perform cell selection, cell reselection, or handover to one or some CAG cells, public network cells, and/or SNPN cells.

Optionally, the seventh message includes sixth indication information, and the sixth indication information indicates whether the terminal device has an onboarding capability. For example, if the core network device rejects onboarding of the terminal device, the sixth indication information indicates that the terminal device does not have the onboarding capability. This prevents subsequent malicious onboarding of the terminal device, and prevents the terminal device from continuously initiating requests for onboarding. If the core network device accepts onboarding of the terminal device, the sixth indication information indicates that the terminal device has the onboarding capability.

Further, after the core network device receives the sixth message sent by the first access network device, where the sixth message includes information about an identifier of the NPN supported by the first cell that is served by the first access network device and that is accessed by the terminal device, the core network device may verify whether the terminal device has onboarded the at least one NPN supported by the first cell. If the terminal device has not onboarded the at least one NPN supported by the first cell, the core network device determines that the terminal device requests to onboard the NPN supported by the first cell. If the terminal device has onboarded the at least one NPN supported by the first cell, the core network device determines that onboarding of the terminal device succeeds.

Optionally, the sixth message includes information about an identifier of an NPN supported by a first PLMN ID of the first cell that is served by the first access network device and that is accessed by the terminal device, and the first PLMN ID is an ID of a PLMN selected by the terminal device for access. The core network device may verify whether the terminal device has onboarded at least one NPN supported by the first PLMN ID. If the terminal device has not onboarded the at least one NPN supported by the first PLMN ID, the core network device determines that the terminal device requests to onboard the NPN supported by the first PLMN ID. If the terminal device has onboarded the at least one NPN supported by the first PLMN ID, the core network device determines that onboarding of the terminal device succeeds.

Further, after the core network device receives the sixth message sent by the first access network device, where the sixth message includes the information about the identifier of the first network, the core network device may verify whether the first network is an onboarded network. If the first network is not an onboarded network, the core network device determines that the terminal device requests to onboard the NPN corresponding to the information about the identifier of the first network. If the first network is an onboarded network, the core network device determines that onboarding of the terminal device succeeds.

Optionally, this embodiment of this application may further include the following steps.

S308b: After receiving the sixth message sent by the first access network device, the core network device determines whether to accept onboarding of the terminal device. If onboarding is rejected, it indicates that onboarding of the terminal device fails, and the core network device sends a fifth message to the first access network device, where the fifth message indicates a cause value used by the core network device to reject the request of the terminal device for onboarding the NPN, or the fifth message indicates that onboarding of the terminal device fails. The fifth message may be a UE context release command (UE context release command), a registration reject (registration reject) message, an initial context setup request (initial context setup request) message, a UE context modification request (UE context modification request) message, a downlink NAS transport (downlink NAS transport) message, or an error indication (error indication) message.

Optionally, the fifth message includes the information about the priorities for the terminal device to access different networks.

S309b: After receiving the fifth message, the first access network device sends a fourth message to the terminal device, where the fourth message indicates a cause value used by the first access network device to reject the request of the terminal device for NPN onboarding, or indicates that onboarding of the terminal device fails. For a specific implementation of S309b, refer to S306. Details of this step are not described again.

Optionally, the core network device may send the cause value to the first access network device by using NAS information in the fifth message, and then the first access network device forwards, to the terminal device by using the fourth message, the NAS information including the cause value.

Optionally, after the first access network device receives the second message sent by the terminal device, this embodiment of this application may further include the following step.

S309a: The first access network device sends a third message to the terminal device, where the third message indicates that NPN onboarding of the terminal device succeeds.

The third message includes information indicating a successfully onboarded NPN, and the information indicating the successfully onboarded NPN includes at least one of the following: information about an identifier of a fourth network or third indication information. The fourth network is the successfully onboarded NPN. The third message may be an MB, a SIB, RRC, a MAC CE, NAS information, downlink control information (downlink control information, DCI), or user plane data information that is used to send a request message to the terminal device. For example, the third message may be an RRC reconfiguration (RRC reconfiguration) message, an RRC setup (RRC setup) message, an RRC resume (RRC resume) message, registration accept (registration accept), or downlink information transfer (DL information transfer).

Further, after the terminal device performs onboarding, the core network device sends, to the first access network device by using NAS or AS information in the seventh message, updated context or subscription information, or the like related to the terminal device, so that the first access network device accurately performs a subsequent handover process, or the first access network device forwards the foregoing information to the terminal device by using the third message. For example, the context or subscription information of the terminal device includes information such as the allowed CAG list (allowed CAG list), the CAG-only indication (CAG-only indication), the radio access technology restrictions (RAT Restrictions) included in the mobility restriction list (mobility restriction list), the forbidden area information (forbidden area information), the service area information (service area information), or the information about the priorities for the terminal device to access different networks.

Further, the first access network device may send, to the terminal device by using the third message, the updated context or subscription information, or the like that is related to the terminal device and that is included in the NAS or AS information, so that the terminal device accurately performs a subsequent cell selection or reselection process or the like. For example, the context or subscription information of the terminal device includes information such as the allowed CAG list (allowed CAG list), the CAG-only indication (CAG-only indication), the radio access technology restrictions (RAT Restrictions) included in the mobility restriction list (mobility restriction list), the forbidden area information (forbidden area information), the service area information (service area information), or the information about the priorities for the terminal device to access different networks.

Optionally, in addition to the foregoing information, the third message may further include information about a network that the terminal device is allowed to access this time. For example, the information about the network that the terminal device is allowed to access includes at least one of the following information: a CAG ID, an NID, an HRNN, or a PLMN ID. After the terminal device receives the third message, if the subscription information of the terminal device or the information about the network that is allowed to be accessed this time is inconsistent with information about a network that the terminal device currently accesses or camps on, for example, the information about the network that is allowed to be accessed this time is inconsistent with an NID/a CAG ID supported by a cell currently accessed by the terminal device, a PNI-NPN onboarded by the terminal device is not in a range of a PNI-NPN supported by the cell currently accessed by the terminal device, or the cell currently accessed by the terminal device does not meet the information about the priorities for the terminal device to access different networks, the terminal device performs network reselection or cell reselection.

Optionally, after onboarding of the terminal device fails, the core network device may send, to the first access network device by using the NAS or AS information in the fifth message, the updated context or subscription information, or the like related to the terminal device, and then the first access network device sends, to the terminal device by using the fourth message, the updated context or subscription information, or the like that is related to the terminal device and that is included in the NAS or AS information.

Optionally, in addition to the foregoing information, the fourth message may further include information about a network that the terminal device is allowed to access this time. For example, the information about the network that the terminal device is allowed to access includes at least one of the following information: a CAG ID, an NID, an HRNN, or a PLMN ID. After the terminal device receives the fourth message, if the subscription information of the terminal device or the information about the network that is allowed to be accessed this time is inconsistent with information about a network that the terminal device currently accesses or camps on, for example, the information about the network that is allowed to be accessed this time is inconsistent with an NID/a CAG ID supported by a cell currently accessed by the terminal device, a PNI-NPN onboarded by the terminal device is not in a range of a PNI-NPN supported by the cell currently accessed by the terminal device, or the cell currently accessed by the terminal device does not meet the information about the priorities for the terminal device to access different networks, the terminal device performs network reselection or cell reselection.

Optionally, the indication information in S301, S303, S304, and S305 indicates the supported onboarding NPN, and the indication information in S302 and S307 indicates the requested onboarding NPN, and the indication information in S308a and S309a indicates the successfully onboarded NPN. An indication manner of the indication information may be shown in Table 1.

supported by the entire cell, access network device, core network device, central unit, distributed unit, central unit user plane, or central unit control plane support or do not support onboarding. If a message includes the PLMN ID and the indication #2, it indicates that all of the NPN network(s) identified by the NID(s)/CAG ID(s) corresponding to the PLMN ID supports (support) onboarding or does (do) not

TABLE 1

| Information element/Group name (IE/Group Name) | Meanings of indications (S301, S303, S304, and S305 are used as examples, S302, S307, S308a, and S309a are similar, and details are not described again) |
| --- | --- |
| Indication #1 | Whether an NPN or NPN(s) supported by the cell, the access network device, the core network device, the central unit, a distributed unit, a central unit user plane, or a central unit control plane that performs transmission (for example, cell system information broadcast, RRC sending, or sending in a setup and configuration update process of each interface) in a Uu interface, an NG interface, the Xn interface, an F1 interface, an E1 interface, or a W1 interface supports or support onboarding |
| PLMN identity list (PLMN ID List) | The PLMN list supported by the cell, the access network device, the core network device, the central unit, the distributed unit, the central unit user plane, or the central unit control plane |
| >PLMN identity (PLMN ID) | |
| Indication #2 | Whether an NPN network(s) identified by an NID(s)/a CAG ID(s) corresponding to the PLMN ID in the previous row supports or support onboarding |
| >CAG identifier list (CAG ID list) | The CAG list supported by the cell, the access network device, the core network device, the central unit, the distributed unit, the central unit user plane, or the central unit control plane |
| >Indication for PNI-NPN #3 | Whether a PNI-NPN(s) corresponding to a CAG ID(s) included in the CAG ID list supports or support onboarding |
| >>CAG identifier (CAG ID) | |
| >>Indication #4 | Whether a PNI-NPN corresponding to the CAG ID in the previous row supports onboarding |
| >>Human readable network name (HRNN) | |
| >>Indication #5 | Whether a PNI-NPN corresponding to the HRNN in the previous row supports onboarding |
| >Network identifier list (NID list) | The NID list supported by the cell, the access network device, the core network device, the central unit, the distributed unit, the central unit user plane, or the central unit control plane |
| >Indication for SNPN #6 | Whether an SNPN(s) corresponding to an NID(s) in the NID list supports or support onboarding |
| >>Network identifier (NID) | |
| Indication #7 | Whether an SNPN corresponding to the NID in the previous row supports onboarding |
| >>Human readable network name (HRNN) | |
| >>Indication #8 | Whether an SNPN corresponding to the HRNN in the previous row supports onboarding |
| Tracking area list (TA list) | The tracking area list supported by the cell, the access network device, the core network device, the central unit, the distributed unit, the central unit user plane, or the central unit control plane |
| >Tracking area code (TAC) | |
| >Indication #9 | Whether an SNPN, a PNI-NPN, a CAG, or an NID in the TAC in the previous row supports onboarding |

That the indication indicates whether to support onboarding is described in Table 1, and different indications in the table may exist at the same time or only several of the different indications exist. Similarly, other information elements may exist at the same time or only several of the other information elements exist. For example, if a message includes the indication #1, it indicates that all of the NPNs supported by the entire cell, access network device, core network device, central unit, distributed unit, central unit user plane, or central unit control plane support or do not support onboarding. If a message includes the CAG ID and the indication #4, the HRNN and the indication #5, the NID and the indication #7, or the HRNN and the indication #8, the indication #4 indicates whether the PNI-NPN corresponding to the CAG ID supports onboarding, the indication #5 indicates whether the PNI-NPN corresponding to the HRNN supports onboarding, the indication #7 indicates whether the SNPN corresponding to the NID supports onboarding, the indication #8 indicates whether the SNPN corresponding to the HRNN supports onboarding, and the indication #9 indicates whether the SNPN, the PNI-NPN, the CAG, or the NID in the TAC supports onboarding. Others are similar and are not described herein again. The indication information may indicate whether an NPN(s) supported by a cell served by the access network device, the core network device, the central unit, the distributed unit, the central unit user plane, or the central unit control plane, an NPN(s) in a tracking area (TA), a NPN(s) in a PLMN, or the like supports (support) onboarding. The cell may be identified by one or more of the following: a cell identity (cell identity), a cell global identifier (cell global identifier, CGI), or a physical cell identifier (physical cell identifier, PCI). The tracking area may be identified by one or more of the following: a tracking area code (tracking area code, TAC), or a tracking area identity (tracking area identity, TAD. The PLMN may be identified by the PLMN ID. An indication manner for indicating a requested onboarding NPN and an indication manner for indicating a successfully onboarded NPN are similar to those in Table 1, and details are not described herein again. The indication may be set as support (support), unsupport (unsupport), enabled (enabled), disabled (disabled), a Boolean value 1, a Boolean value 0, yes (yes), not (not), (successful) successful, failed (failed), or the like. It should be understood that the indication information may be implemented not only by using the indication, but also in another manner. For example, a cause value (cause value) is used for indication. The RRC setup request (RRC setup request) message sent by the terminal device to the access network device includes an establishment cause value (establishmentCause). The establishment cause value is onboarding (subscribing, onboarding, provisioning, or the like), to indicate that the terminal device sends a message due to the request for onboarding. The RRC resume request (RRC resume request) message sent by the terminal device to the access network device includes a resume cause value (resumeCause), and the resume cause value is onboarding, to indicate that the terminal device sends a message due to the request for onboarding. The RRC reestablishment request (RRC reestablishment request) message sent by the terminal device to the access network device includes a reestablishment cause value (reestablishmentCause), and the reestablishment cause value is onboarding, to indicate that the terminal device sends a message due to the request for onboarding.

The indication information and the information about the identifier of the NPN may be sent in different SIBS or messages, or may be sent in a same SIB or message. The information about the identifier of the NPN may include at least one of the following: a PLMN ID, an NID, a CAG ID, or an HRNN. For example, the indication is sent in the SIB 1, to broadcast whether this cell supports NPN onboarding. For example, the indication and the information about the identifier of the NPN are sent in the SIB 1, to indicate an onboarding NPN supported by this cell. For example, the information about the identifier of the NPN is sent in the SIB 1, and the indication is sent in a SIB 2, another SIB in an existing standard, or a newly defined SIB, to indicate an onboarding NPN supported by this cell. For example, the indication, information about identifiers of an NPN #1 and an NPN #2 that are supported by this cell, and information about an identifier of an onboarding NPN #1 supported by this cell may be broadcast in the SIB 1, and information about identifiers of an onboarding NPN #3 and an onboarding NPN #4 that are supported by this cell is broadcast in a SIB 2, another SIB in an existing standard, or a newly defined SIB. For example, the indication and information about identifiers of an NPN #1 and an NPN #2 that are supported by this cell are broadcast in the SIB 1, and information about identifiers of an onboarding NPN #1, an onboarding NPN #3, and an onboarding NPN #4 that are supported by this cell is broadcast in a SIB 2, another SIB in an existing standard, or a newly defined SIB. Optionally, the indication may not only indicate whether this cell supports NPN onboarding, but also indicate whether a neighboring cell supports NPN onboarding. For example, 00 indicates that neither this cell nor the neighboring cell supports onboarding; 01 indicates that this cell supports onboarding and the neighboring cell does not support onboarding; 10 indicates that this cell does not support onboarding and the neighboring cell supports onboarding; 11 indicates that both this cell and the neighboring cell support onboarding.

Optionally, information indicating the supported onboarding NPN is included in S301, S303, S304, and S305, information indicating the requested onboarding NPN is included in S302 and S307, and information indicating the successfully onboarded NPN is included in S308a and S309a. Optionally, the information indicating the supported onboarding NPN, the information indicating the requested onboarding NPN, and the information indicating the successfully onboarded NPN may be shown in Table 2 or Table 3.

TABLE 2

| Information element/Group name (IE/Group Name) | Meanings (S301, S303, S304, and S305 are used as examples, S302, S307, S308a, and S309a are similar, and details are not described again) |
|---|---|
| PLMN identity list (PLMN ID List) | |
| >PLMN identity (PLMN ID) | The PLMN identity corresponding to an onboarding CAG(s) and/or NID(s) supported by the cell, the access network device, the core network device, the central unit, the distributed unit, the central unit user plane, or the central unit control plane |
| >CAG identifier list (CAG ID list) | |
| >>CAG identifier (CAG ID) | The identifier of an onboarding CAG supported by the cell, the access network device, the core network device, the central unit, the distributed unit, the central unit user plane, or the central unit control plane |

TABLE 2-continued

| Information element/Group name (IE/Group Name) | Meanings (S301, S303, S304, and S305 are used as examples, S302, S307, S308a, and S309a are similar, and details are not described again) |
|---|---|
| >>Human readable network name (HRNN) | The human readable network name corresponding to the identifier of the onboarding CAG supported by the cell, the access network device, the core network device, the central unit, the distributed unit, the central unit user plane, or the central unit control plane |
| >Network identifier list (NID list) | |
| >>Network identifier (NID) | The onboarding NID supported by the cell, the access network device, the core network device, the central unit, the distributed unit, the central unit user plane, or the central unit control plane |
| >>Human readable network name (HRNN) | The human readable network name corresponding to the onboarding NID supported by the cell, the access network device, the core network device, the central unit, the distributed unit, the central unit user plane, or the central unit control plane |

TABLE 3

| Information element/Group name (IE/Group Name) | Meanings (S301, S303, S304, and S305 are used as examples, S302, S307, S308a, and S309a are similar, and details are not described again) |
|---|---|
| Public network list PLMN identity list (PLMN ID List) | |
| >PLMN identity (PLMN ID) | |
| >Information about an identifier of an NPN network | A public network identified by the PLMN ID in the previous row may be used to onboard the NPN corresponding to the information about the identifier of the NPN network in this row |
| Private network list PLMN identity list (PLMN ID List.) | |
| >PLMN identity (PLMN ID) | PLMN identity corresponding to a CAG(s) and/or an NID(s) |
| >Information about an identifier of an NPN network | A private network identified by the PLMN ID in the previous row and the following CAG(s) and/or NID(s) may be used to onboard the NPN corresponding to the information about the identifier of the NPN network in this row |
| >CAG identifier list (CAG ID list) | |
| >Information about an identifier of an NPN network | A PNI-NPN(s) corresponding to a CAG ID(s) included in the CAG identifier list may be used to onboard the NPN corresponding to the information about the identifier of the NPN network in this row |
| >>CAG identifier (CAG ID) | |
| >>Information about an identifier of an NPN network | A PNI-NPN corresponding to the CAG ID in the previous row may be used to onboard the NPN corresponding to the information about the identifier of the NPN network in this row |
| >>Human readable network name (HRNN) | |
| >>Information about an identifier of an NPN network | A PNI-NPN corresponding to the HRNN in the previous row may be used to onboard the NPN corresponding to the information about the identifier of the NPN network in this row |
| >Network identifier list (NID list) | |
| >Information about an identifier of an NPN network | An SNPN(s) corresponding to an NID(s) included in the NID list may be used to onboard the NPN corresponding to the information about the identifier of the NPN network in this row |

TABLE 3-continued

| Information element/Group name (IE/Group Name) | Meanings (S301, S303, S304, and S305 are used as examples, S302, S307, S308a, and S309a are similar, and details are not described again) |
|---|---|
| >> Network identifier (NID) | |
| >>Information about an identifier of an NPN network | An SNPN corresponding to the NID in the previous row may be used to onboard the NPN corresponding to the information about the identifier of the NPN network in this row |
| >>Human readable network name (HRNN) | |
| >>Information about an identifier of an NPN network | An SNPN corresponding to the HRNN in the previous row may be used to onboard the NPN corresponding to the information about the identifier of the NPN network in this row |

The information about the identifier of the NPN may include at least one of the following: a PLMN ID, an NID, a CAG ID, or an HRNN. In Table 3, the public network PLMN, the private network PNI-NPN, or the SNPN may be used to onboard this NPN or another NPN. By accessing a core network device such as an AMF in the public network PLMN, the private network PNI-NPN, or the SNPN, the terminal device may onboard this NPN or another NPN. It should be understood that the information about the identifier of the NPN network may alternatively be information about an identifier of the public network PLMN network, and the public network PLMN, the private network PNI-NPN, or the SNPN may be used to onboard the public network.

In the foregoing table, if there are a plurality of identifiers, the identifiers may be in a form of an identifier list. If there is only one identifier, the identifier may not be in a form of a list.

Table 1 to Table 3 are also applicable to S501 to S510, S601 to S607, S701 to S707, S801 to S810, and S901 to S903. Details are not described in the following. By accessing this network, the terminal device may onboard this network, or may onboard another network. One network may perform onboarding of this network, or may assist another network in performing onboarding.

Optionally, the terminal device may initiate an onboarding request before an RRC setup complete (RRC setup complete) message that is in a random access process, or the terminal device or the first access network device may initiate the onboarding request after the UE enters a connected state. After the UE successfully performs initial access, the core network device may send an initial context setup request (initial context setup request) message to the first access network device. The initial context setup request message may carry indication information, and the indication information indicates whether the terminal device has an onboarding capability.

Optionally, in the foregoing process, the terminal device initiates the onboarding request, or the first access network device or the core network device may initiate the onboarding request. For example, the first access network device or the core network device sends a request message to the terminal device by using the MIB, the SIB, the RRC, the MAC CE, the NAS information, the downlink control information (downlink control information, DCI), or the user plane data information, to actively request NPN onboarding with the terminal device. In other words, in step S301, step S308, or step S309, the first access network device or the core network device sends information about the related NPN that needs to be onboarded, and actively requests to onboard the corresponding NPN with the terminal device.

It should be noted that, the process described above is applicable to SNPN onboarding through the PLMN RAN, PNI-NPN onboarding through the PLMN RAN, PLMN onboarding through the PLMN RAN, SNPN onboarding through the PNI-NPN RAN, PNI-NPN onboarding through the PNI-NPN RAN, PLMN onboarding through the PNI-NPN RAN, PNI-NPN onboarding through the SNPN RAN, PLMN onboarding through the SNPN RAN, and SNPN onboarding through the SNPN RAN.

It should be noted that onboarding mentioned in this embodiment of this application may also be expressed as online registration, online provisioning (provisioning), online deployment (deployment), or the like, and is mainly used to resolve a problem of how a network system provides and updates subscription information of a terminal device to allow the terminal device to request to connect to an expected NPN. In this way, the terminal flexibly accesses an NPN that is not onboarded by the terminal, and an operator can flexibly and promptly allow potential users to access the NPN network. This embodiment of this application is applicable to an onboarding process, including a process of updating, modifying, deleting, adding, or releasing the subscription information.

It should be noted that information about an identifier of an NPN network may include at least one of the following: a PLMN ID, an NID, a CAG ID, or an HRNN, or may include other information that may be used to identify the identifier of the NPN network.

In this embodiment of this application, the access network device indicates a supported onboarding NPN to the terminal device, and the terminal device may request NPN onboarding, so that the terminal device and a network side can dynamically update information about an NPN that is onboarded by the terminal device, and the terminal device can flexibly access an NPN that is not onboarded by the terminal device. In this way, communication efficiency is improved.

Figure 5:
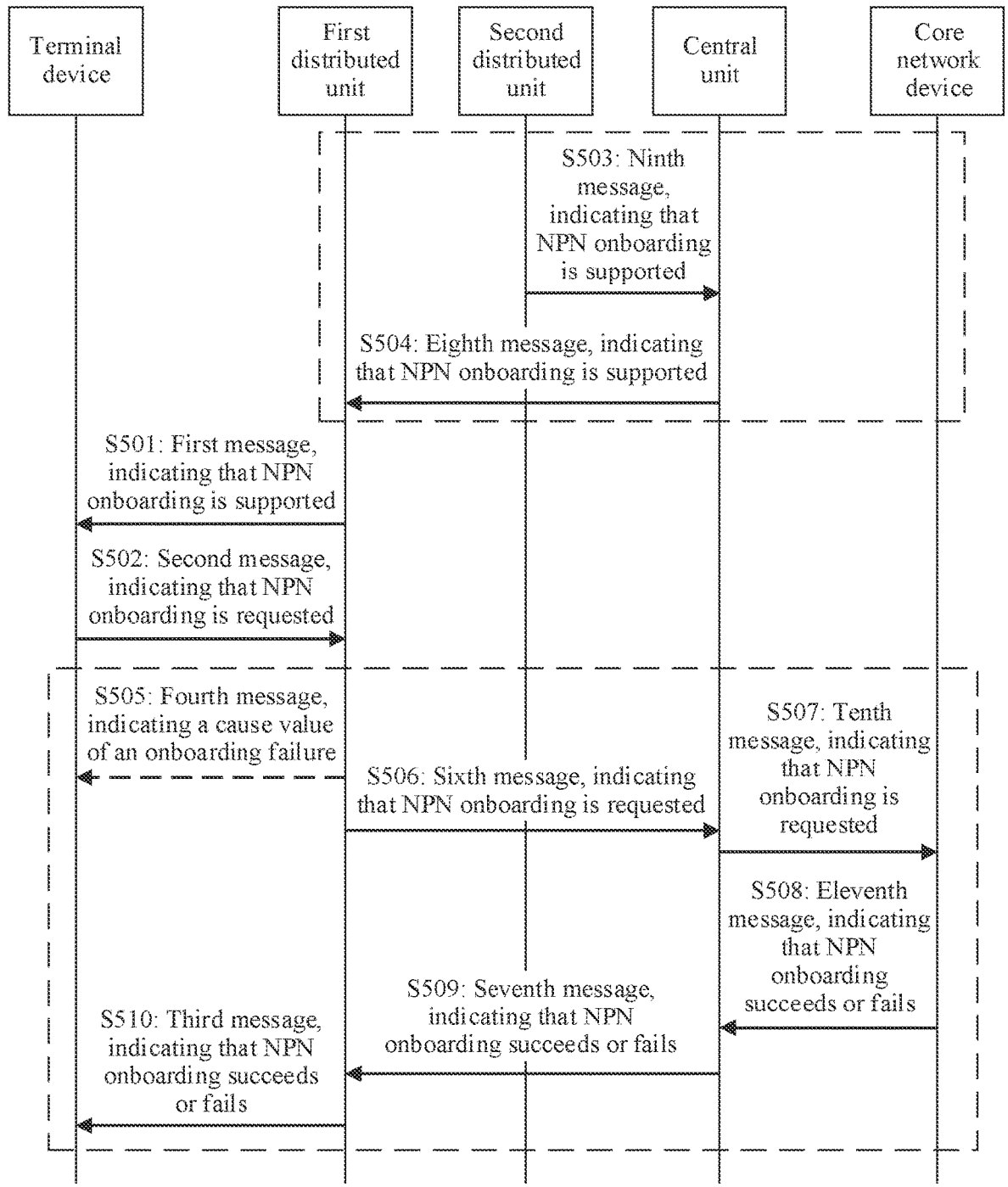
FIG. 5 is a schematic flowchart of another communication method according to an embodiment of this application.

FIG. 5 is a schematic flowchart of another communication method according to an embodiment of this application. A first access network device may include a first distributed unit and a central unit, a second access network device may include a second distributed unit and the central unit, and the first distributed unit and the second distributed unit are connected to a same central unit. The method includes but is not limited to the following steps.

S501: The first distributed unit sends a first message to a terminal device, where the first message indicates that a cell served by the first distributed unit supports NPN onboarding and/or a cell served by the second distributed unit supports NPN onboarding. For a specific implementation of S501, refer to the description of S301 in the foregoing embodiment. Details are not described herein again.

Optionally, before the first distributed unit sends the first message to the terminal device, the method in this embodiment of this application may further include the following step.

S503: The second distributed unit sends a ninth message to the central unit. The ninth message indicates that the second distributed unit supports NPN onboarding.

The ninth message includes information indicating an onboarding NPN supported by the second distributed unit, and the information indicating the onboarding NPN supported by the second distributed unit includes at least one of the following: information about an identifier of a first network or first indication information. The first network is the supported onboarding NPN. The information about the identifier of the first network includes at least one of the following: a public land mobile network identifier PLMN ID, a network identifier NID, a closed access group identifier CAG ID, or a human readable network identifier HRNN. For an indication manner of the information about the identifier of the first network or the first indication information, refer to the foregoing embodiment.

The ninth message may be an F1 setup request (F1 setup request) message, an F1 setup response (F1 setup response) message, a gNB-DU configuration update (gNB-DU configuration update) message, a gNB-DU configuration update acknowledgment (gNB-DU configuration update acknowledge) message, a gNB-CU configuration update (gNB-CU configuration update) message, a gNB-CU configuration update acknowledgment (gNB-CU configuration update acknowledge) message, or the like.

Optionally, the ninth message includes information about priorities for accessing different networks supported by the second distributed unit, so that the central unit performs access control, resource scheduling, and the like based on the information. For example, for a second distributed unit that supports a public network and/or an NPN, the ninth message includes a priority for accessing the public network and/or the NPN network supported by the second distributed unit or priorities for accessing different NPNs, PNI-NPNs, SNPNs, NCDs, or CAGs supported by the second distributed unit. For another example, for a second distributed unit that supports only a PNI-NPN cell, the ninth message includes priorities for accessing different CAGs or PNI-NPNs supported by the second distributed unit. A CAG priority, a PLMN priority, an NID priority, and/or the like are/is configured in a cell, a PLMN, or a TA supported by the second distributed unit, to indicate that the central unit may preferentially schedule a resource and the like in one or some CAG cells, public network cells, and/or SNPN cells. Optionally, the information about the priorities for accessing different networks supported by the second distributed unit may be configured by OAM, a core network device, or the central unit for the second distributed unit in an auxiliary manner and sent to the second distributed unit, or may be configured by the second distributed unit.

Optionally, before the first distributed unit sends the first message to the terminal device, the method in this embodiment of this application may further include the following step.

S504: The central unit sends an eighth message to the first distributed unit, where the eighth message indicates that the central unit supports NPN onboarding and/or the second distributed unit supports NPN onboarding.

The eighth message may be an F1 setup response (F1 setup response) message, a gNB-DU configuration update acknowledgment (gNB-DU configuration update acknowledge) message, or a gNB-CU configuration update (gNB-CU configuration update) message. The eighth message includes information indicating a supported onboarding NPN, and the information indicating the supported onboarding NPN includes at least one of the following: information about an identifier of a second network or second indication information. The second network is the supported onboarding NPN. For an indication manner of the information about the identifier of the second network or the second indication information, refer to the indication manner of the information about the identifier of the first network or the first indication information in S301 in the foregoing embodiment.

It should be understood that the onboarding NPN supported by the central unit may be a set of onboarding NPNs supported by a plurality of distributed units (for example, a DU #1, a DU #2, . . . , and a DU #n), or may be a supported onboarding NPN configured by the OAM or the like for the central unit.

Optionally, the eighth message includes information about priorities for accessing different networks supported by the central unit, so that the first distributed unit performs access control and resource scheduling based on the information, and the information may be further used to assist the first distributed unit in configuring an access control parameter (for example, UAC) and the like. For example, for a central unit that supports a public network and/or an NPN, the eighth message includes a priority for the central unit to access the public network and/or the NPN network, or priorities for accessing different NPNs, PNI-NPNs, SNPNs, NIDs, or CAGs supported by the central unit. For another example, for a central unit that supports only a PNI-NPN, priorities for accessing different CAGs supported by the central unit are configured. A CAG priority, a PLMN priority, an NID priority, and/or the like are/is configured in a cell, a PLMN, or a TA supported by the central unit, to indicate that the first distributed unit may preferentially schedule a resource in one or some CAG cells, PNI-NPN cells, public network cells, and/or SNPN cells, and to assist the first distributed unit in configuring an access control parameter, broadcasting a corresponding parameter over a Uu interface, and the like. Optionally, the information about the priorities for accessing different networks supported by the central unit may be configured by the OAM, the core network device, or the first distributed unit for the central unit in an auxiliary manner and sent to the central unit, or may be configured by the central unit.

Further, the central unit may be deployed as a central unit user plane (CU-UP) and a central unit control plane (CU-CP), and the central unit user plane and the central unit control plane are connected through an E1 interface. Similarly, the central unit user plane may send a message to the central unit control plane, to indicate information that is configured by the central unit user plane and that is about priorities for accessing different supported networks, where the sent message may be a gNB-CU-UP E1 setup request (gNB-CU-UP E1 setup request), a gNB-CU-CP E1 setup response (gNB-CU-CP E1 setup response), gNB-CU-UP configuration update (gNB-CU-UP configuration update), or gNB-CU-CP configuration update acknowledgment (gNB- CU-CP configuration update acknowledge). The central unit control plane may send a message to the central unit user plane, to indicate information that is configured by the central unit control plane and that is about priorities for accessing different supported networks, where the sent message may be a gNB-CU-UP E1 setup response (gNB-CU-UP E1 setup response), a GNB-CU-CP E1 setup request (GNB-CU-CP E1 setup request), GNB-CU-UP configuration update acknowledgment (GNB-CU-UP configuration update acknowledge), or GNB-CU-CP configuration update (GNB-CU-CP configuration update). For a specific priority sending and configuration method of the E1 interface, refer to S303, S304, S305, S503, and S504. Details are not described again.

S502: The terminal device sends a second message to the first distributed unit, where the second message indicates that the terminal device requests NPN onboarding. For a specific implementation of S502, refer to the description of S302 in the foregoing embodiment. Details are not described herein again.

Optionally, after the terminal device sends the second message to the first distributed unit, the method in this embodiment of this application may further include the following step.

S505: The first distributed unit sends a fourth message to the terminal device, where the fourth message indicates a cause value used by the first distributed unit to reject the request of the terminal device for NPN onboarding. For a specific implementation of S505, refer to the description of S306 in the foregoing embodiment. Details are not described herein again.

Optionally, after the terminal device sends the second message to the first distributed unit, the method in this embodiment of this application may further include the following step.

S506: The first distributed unit sends a sixth message to the central unit, where the sixth message indicates that the terminal device requests NPN onboarding.

After receiving the second message sent by the terminal device, the first distributed unit may determine whether an onboarding NPN requested by the terminal device is the supported onboarding NPN. A specific implementation is similar to S307 in the foregoing embodiment, and details are not described herein again. Alternatively, the first distributed unit may not process the second message, but send the sixth message to the central unit, and the central unit processes the sixth message.

Optionally, the sixth message may be initial uplink RRC message transfer (initial UL RRC message transfer), uplink RRC message transfer (UL RRC message transfer), a UE context setup response (UE context setup response), a UE context modification response (UE context modification response), a UE context release request (UE context release request), or a UE context modification request (UE context modification required).

S507: The central unit sends a tenth message to the core network device. The tenth message indicates that the terminal device requests NPN onboarding. The tenth message may be an initial UE message (initial UE message) or an uplink NAS transport (uplink NAS transport) message. For a specific implementation of S507, refer to the description of S307 in the foregoing embodiment. Details are not described herein again.

S508: The core network device sends an eleventh message to the centralized unit, where the eleventh message indicates that NPN onboarding succeeds or fails. The eleventh message may be an initial context setup request (initial context setup request), a UE context modification request (UE context modification request), a downlink NAS transport (downlink NAS transport) message, or a registration accept (registration accept) message. For a specific implementation of S508, refer to the descriptions of S308a and S308b in the foregoing embodiment. Details are not described herein again.

S509: The central unit sends a seventh message to the first distributed unit, where the seventh message indicates that NPN onboarding succeeds or fails. Content and a function included in the seventh message are the same as those included in the eleventh message, and details are not described herein again.

Optionally, the seventh message may be downlink RRC message transfer (DL RRC message transfer), a UE context setup request (UE context setup request), a UE context modification request (UE context modification request), a UE context release command (UE context release command), or UE context modification acknowledgment (UE context modification confirm).

S510: The first distributed unit sends a third message to the terminal device, where the third message indicates that an NPN onboarding succeeds. The third message includes information indicating a successfully onboarded NPN, and the information indicating the successfully onboarded NPN includes at least one of the following: information about an identifier of a fourth network or third indication information. The fourth network is the successfully onboarded NPN. The third message may be an RRC setup (RRC setup) message, an RRC resume (RRC resume) message, registration accept (registration accept), or downlink information transfer (DL information transfer). For a specific implementation of S510, refer to the description of S309a in the foregoing embodiment. Details are not described herein again.

Optionally, in a network deployment scenario in which the DU and the CU are shared by a plurality of networks, the terminal device may send, by using the second message, an NID or a CAG ID selected by the terminal device for access. If the DU can read NID or CAG ID information in the message, and if the NID or the CAG ID selected by the terminal device for access is not supported by the CU, the DU sends a message to the CU, for example, sends a UE context release request (UE context release request) message to the CU, so that the CU releases a resource and a context that are configured for the UE. The message sent by the DU to the CU includes a cause value (cause value) for releasing the context and the resource. The cause value may be an NID (NID not served by the CU or NID not supported by the CU) not supported by the CU or a CAG ID (CAG ID not served by the CU or CAG not supported by the CU) not supported by the CU. The second message may be an RRC setup complete (RRC setup complete) message. The DU may learn of, from an F1 interface setup process, a CU configuration update process, or the like, information about an NID or a CAG ID supported by the CU.

In this embodiment of this application, a cell in which the terminal device is located assists a neighboring cell in NPN onboarding. In this way, the terminal device can onboard, in one cell, NPNs supported by a plurality of cells, to reduce signaling overheads of NPN onboarding between the terminal device and the first access network device.

Figure 6:
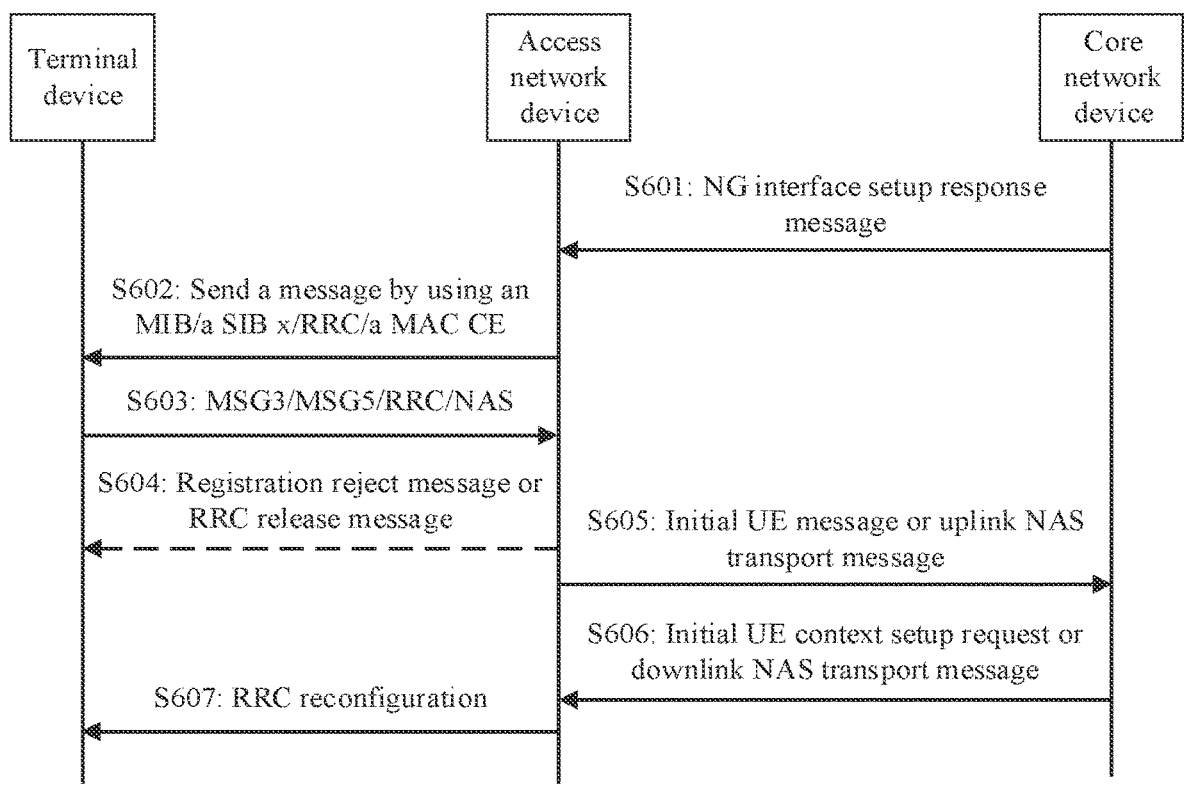
FIG. 6 is a schematic flowchart of another communication method according to an embodiment of this application.

FIG. 6 is a schematic flowchart of another communication method according to an embodiment of this application. This embodiment of this application includes at least the following steps.

S601: A core network device sends an NG interface setup response (NG setup response) message to an access network device. The NG interface setup response message indicates an onboarding NPN supported by the core network device. For a specific implementation of this step, refer to the description of S304 in the foregoing embodiment. Details are not described herein again.

S602: The access network device sends a message to a terminal device by using an MIB, a SIB, RRC, a MAC CE, NAS information, user plane data information, or the like. The message indicates that a cell served by the access network device supports NPN onboarding. For a specific implementation of this step, refer to the description of S301 in the foregoing embodiment. Details are not described herein again.

S603: The terminal device sends a message to the access network device by using the RRC, the MAC CE, the NAS information, the user plane data information, or the like. The message indicates that the terminal device requests NPN onboarding. For a specific implementation of this step, refer to the description of S302 in the foregoing embodiment. Details are not described herein again.

S604: The access network device determines an onboarding NPN requested by the terminal device. When determining that the onboarding NPN requested by the terminal device is not an onboarding NPN supported by the access network device, or not the onboarding NPN supported by the core network device, the access network device sends a registration reject (registration reject) message or an RRC release (RRC release) message to the terminal device, where the message indicates a cause value used by the access network device to reject the request of the terminal device for NPN onboarding. For a specific implementation of this step, refer to the description of S306 in the foregoing embodiment. Details are not described herein again.

S605: The access network device sends an initial UE message (initial UE message) or an uplink NAS transport (uplink NAS transport) message to the core network device. For a specific implementation of this step, refer to the description of S307 in the foregoing embodiment. Details are not described herein again.

S606: The core network device determines whether to accept onboarding of the terminal device. If onboarding is accepted, the core network device updates context or subscription information related to the terminal device, for example, updates an allowed CAG list (allowed CAG list) of the UE, a CAG-only indication (CAG-only indication), or the like. If onboarding is rejected, it indicates that onboarding of the terminal device fails. The core network device may send an initial UE context setup request (initial UE context setup request) or a downlink NAS transport (downlink NAS transport) message to the access network device, to indicate that NPN onboarding of the terminal device succeeds or fails. For a specific implementation of this step, refer to the descriptions of S308a and S308b in the foregoing embodiment. Details are not described herein again.

S607: The access network device sends an RRC reconfiguration (RRC reconfiguration) message or the foregoing registration reject message to the terminal device, where the RRC reconfiguration message indicates that NPN onboarding of the terminal device succeeds. For a specific implementation of this step, refer to the descriptions of S309a and S309b in the foregoing embodiment. Details are not described herein again.

Figure 7:
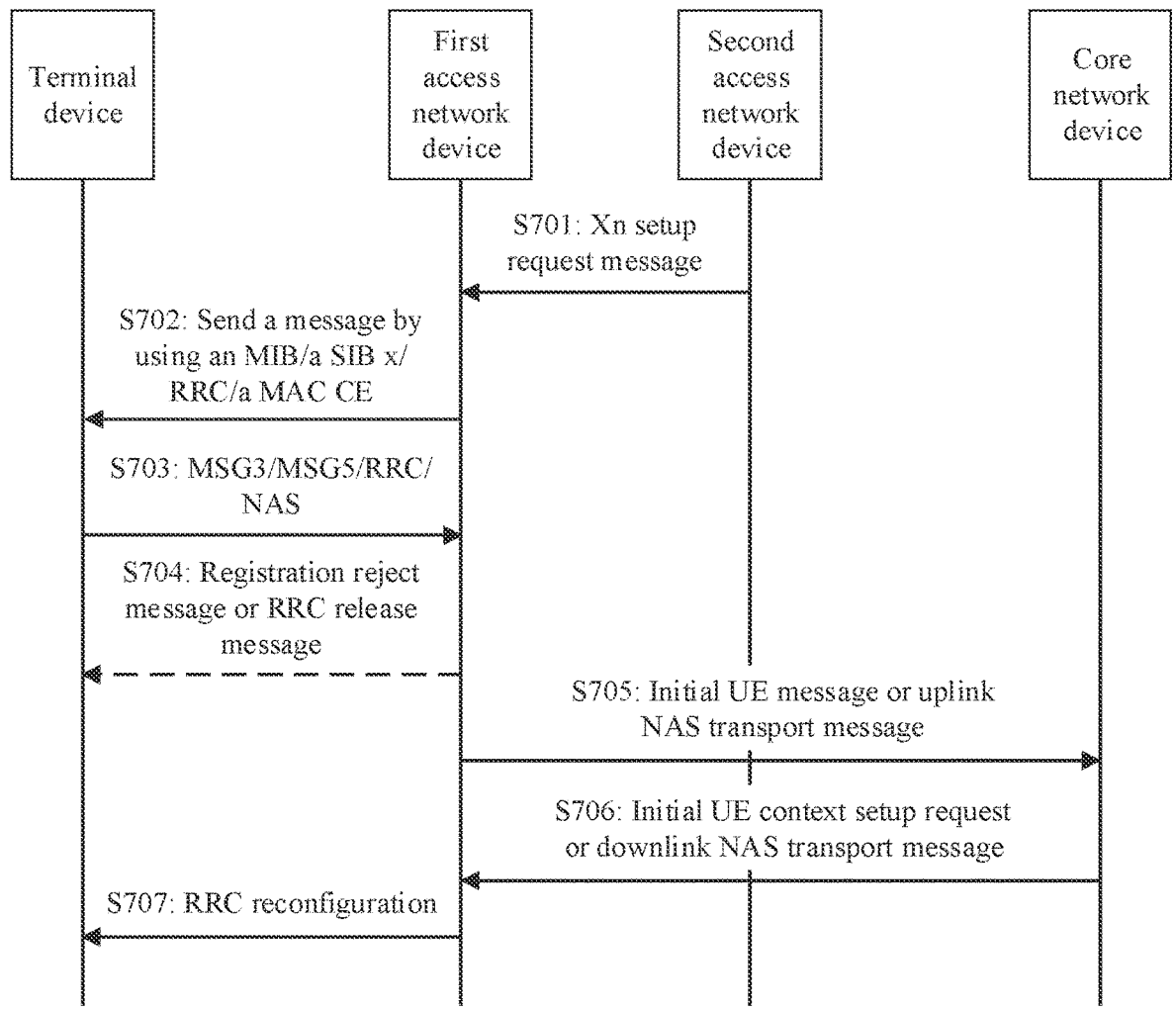
FIG. 7 is a schematic flowchart of another communication method according to an embodiment of this application.

FIG. 7 is a schematic flowchart of another communication method according to an embodiment of this application. This embodiment of this application includes at least the following steps.

S701: A first access network device receives an Xn setup request (Xn setup request) message sent by a second access network device. The Xn setup request message indicates an onboarding NPN supported by a cell served by the second access network device or the second access network device. For a specific implementation of this step, refer to the description of S305 in the foregoing embodiment. Details are not described herein again.

S702: The first access network device sends a message to a terminal device by using an MIB, a SIB, RRC, a MAC CE, NAS information, user plane data information, or the like. The message indicates an onboarding NPN supported by a cell served by the first access network device, the cell served by the second access network device, or the second access network device. For a specific implementation of this step, refer to the description of S301 in the foregoing embodiment. Details are not described herein again.

S703: The terminal device sends a message to the first access network device by using the RRC, the MAC CE, the NAS information, the user plane data information, or the like. The message indicates that the terminal device requests NPN onboarding. For a specific implementation of this step, refer to the description of S302 in the foregoing embodiment. Details are not described herein again.

S704: The first access network device determines an onboarding NPN requested by the terminal device. When determining that the onboarding NPN requested by the terminal device is not an onboarding NPN supported by the first access network device, not an onboarding NPN supported by the second access network device, or not an onboarding NPN supported by a core network device, the first access network device sends a registration reject (registration reject) message or an RRC release (RRC release) message to the terminal device, where the message indicates a cause value used to reject the request of the terminal device for NPN onboarding. For a specific implementation of this step, refer to the description of S306 in the foregoing embodiment. Details are not described herein again.

S705: The first access network device sends an initial UE message (initial UE message) or an uplink NAS transport (uplink NAS transport) message to the core network device. For a specific implementation of this step, refer to the description of S307 in the foregoing embodiment. Details are not described herein again.

S706: The core network device determines whether to accept onboarding of the terminal device. If onboarding is accepted, the core network device updates context or subscription information related to the terminal device, for example, updates an allowed CAG list (allowed CAG list) of the UE, a CAG-only indication (CAG-only indication), or the like. If onboarding is rejected, it indicates that onboarding of the terminal device fails. The core network device may send an initial UE context setup request (initial UE context setup request) or a downlink NAS transport (downlink NAS transport) message to the first access network device, to indicate that NPN onboarding of the terminal device succeeds or fails. For a specific implementation of this step, refer to the descriptions of S308a and S308b in the foregoing embodiment. Details are not described herein again.

S707: The first access network device sends an RRC reconfiguration (RRC reconfiguration) message or the foregoing registration reject (registration reject) message to the terminal device, where the RRC reconfiguration message indicates that NPN onboarding of the terminal device succeeds. For the registration reject message, refer to S704. For a specific implementation of this step, refer to the descriptions of S309*a* and S309*b* in the foregoing embodiment. Details are not described herein again.

Figure 8:
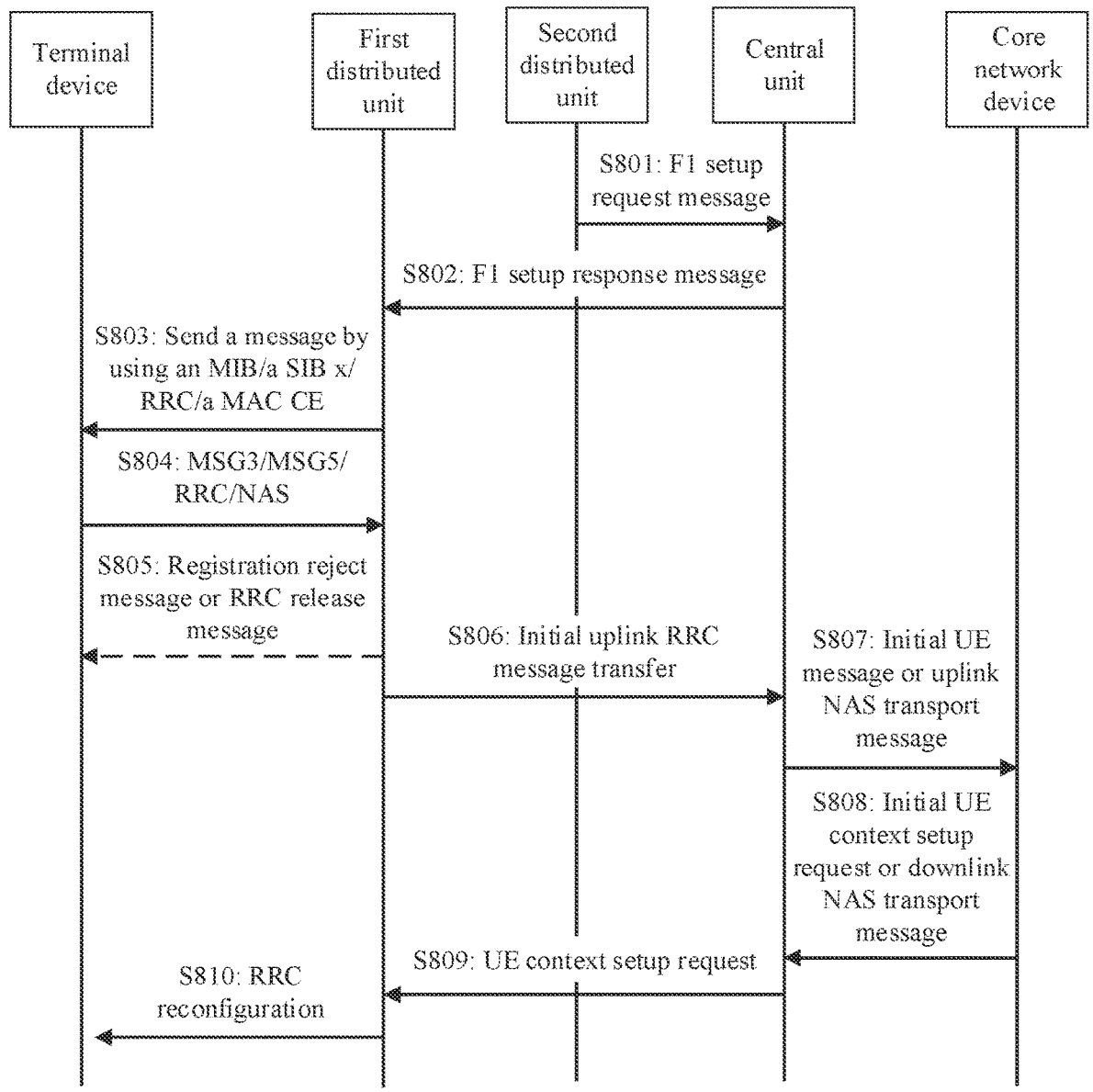
FIG. 8 is a schematic flowchart of another communication method according to an embodiment of this application.

FIG. 8 is a schematic flowchart of another communication method according to an embodiment of this application. This embodiment of this application includes at least the following steps.

S801: A second distributed unit sends an F1 setup request (F1 setup request) message to a central unit. The F1 setup request message indicates that the second distributed unit supports NPN onboarding. For a specific implementation of this step, refer to the description of S503 in the foregoing embodiment. Details are not described herein again.

S802: The central unit sends an F1 setup response (F1 setup response) message to a first distributed unit, where the F1 setup response message indicates that the central unit supports NPN onboarding and/or the second distributed unit supports NPN onboarding. For a specific implementation of this step, refer to the description of S504 in the foregoing embodiment. Details are not described herein again.

S803: The first distributed unit sends a message to a terminal device by using an MIB, a SIB, RRC, a MAC CE, NAS information, user plane data information, or the like. The message indicates that the first distributed unit and the second distributed unit each support NPN onboarding. For a specific implementation of this step, refer to the description of S501 in the foregoing embodiment. Details are not described herein again.

S804: The terminal device sends a message to the first distributed unit by using the RRC, the MAC CE, the NAS information, the user plane data information, or the like. The message indicates that the terminal device requests NPN onboarding. For a specific implementation of this step, refer to the description of S502 in the foregoing embodiment. Details are not described herein again.

S805: The first distributed unit determines an onboarding NPN requested by the terminal device. When determining that the onboarding NPN requested by the terminal device is not the onboarding NPN supported by the first distributed unit, not the onboarding NPN supported by the second distributed unit, or not an onboarding NPN supported by a core network device, the first distributed unit sends a registration reject (registration reject) message or an RRC release (RRC release) message to the terminal device, where the message indicates a cause value used to reject the request of the terminal device for NPN onboarding. For a specific implementation of this step, refer to the description of S505 in the foregoing embodiment. Details are not described herein again.

S806: The first distributed unit sends an initial uplink RRC message transfer (initial UL RRC message transfer) message to the central unit, where the initial uplink RRC message transfer message indicates that the terminal device requests NPN onboarding. For example, when an onboarding NPN requested by the terminal device is the onboarding NPN supported by the first distributed unit, is the onboarding NPN supported by the second distributed unit, or is the onboarding NPN supported by the core network device, the first distributed unit sends the message to the central unit. For a specific implementation of this step, refer to the description of S506 in the foregoing embodiment. Details are not described herein again.

S807: The central unit sends an initial UE message (initial UE message) or an uplink NAS transport (uplink NAS transport) message to the core network device. For a specific implementation of this step, refer to the description of S507 in the foregoing embodiment. Details are not described herein again.

S808: The core network device determines whether to accept onboarding of the terminal device. If onboarding is accepted, the core network device updates context or subscription information related to the terminal device, for example, updates an allowed CAG list (allowed CAG list) of the UE, a CAG-only indication (CAG-only indication), or the like. If onboarding is rejected, it indicates that onboarding of the terminal device fails. The core network device may send an initial UE context setup request (initial UE context setup request) message or a downlink NAS transport (downlink NAS transport) message to the central unit, to indicate that NPN onboarding of the terminal device succeeds or fails. For a specific implementation of this step, refer to the description of S508 in the foregoing embodiment. Details are not described herein again.

S809: The central unit sends a UE context setup request (UE context setup request) message to the first distributed unit, where the UE context setup request indicates that NPN onboarding succeeds or fails. For a specific implementation of this step, refer to the description of S509 in the foregoing embodiment. Details are not described herein again.

S810: The first distributed unit sends an RRC reconfiguration message or the foregoing registration reject message to the terminal device, where the RRC reconfiguration message indicates that NPN onboarding of the terminal device succeeds. For a specific implementation of this step, refer to the description of S510 in the foregoing embodiment. Details are not described herein again.

Figure 9:
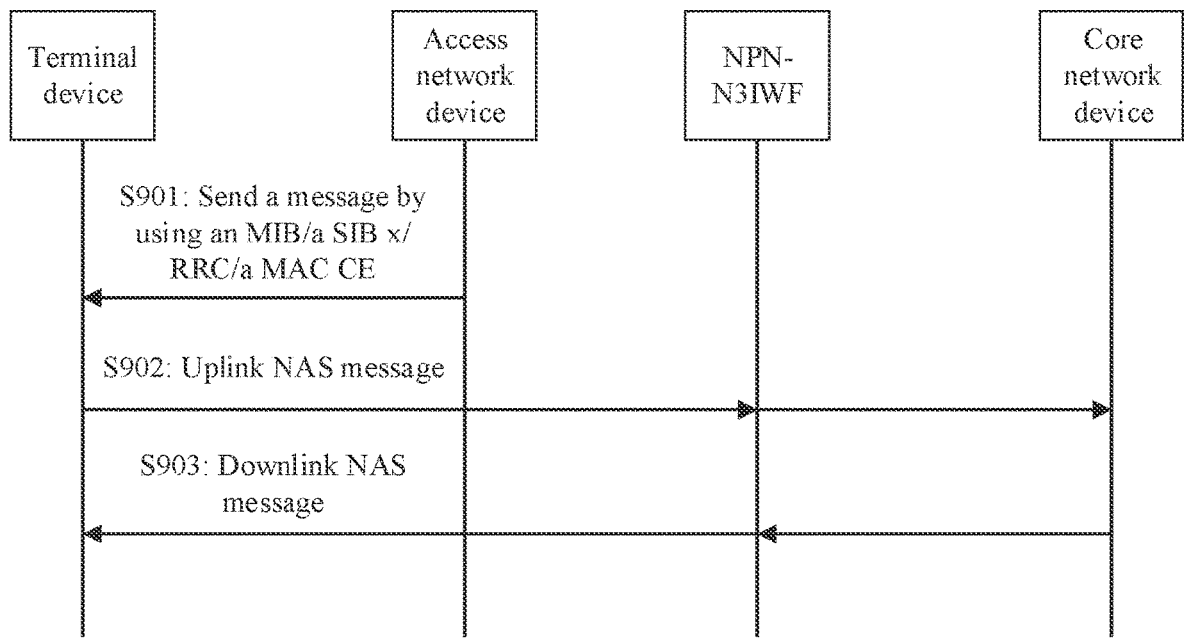
FIG. 9 is a schematic flowchart of another communication method according to an embodiment of this application.

FIG. 9 is a schematic flowchart of another communication method according to an embodiment of this application. This embodiment of this application includes at least the following steps.

S901: An access network device sends a message to a terminal device by using an MIB, a SIB, RRC, a MAC CE, NAS information, user plane data information, or the like, where the message indicates an onboarding NPN supported by the access network device. The message may include address information of an N3IWF entity. For a specific implementation of this step, refer to the description of S301 in the foregoing embodiment. Details are not described herein again.

S902: The terminal device sets up an IPsec tunnel based on the address information of the N3IWF entity, and sends an uplink NAS message to a core network device through the established IPsec tunnel, where the uplink NAS message is used to requests NPN onboarding. The address information of the N3IWF entity may be sent by the access network device to the terminal device, or may be already stored by the terminal device. For a specific implementation of this step, refer to the description of S302 in the foregoing embodiment. Details are not described herein again. The N3IWF entity may be another entity, for example, a third-party provider (service provider) or a third-party device.

S903: The core network device sends a downlink NAS message to the terminal device through the IPsec tunnel that is set up, where the downlink NAS message indicates that NPN onboarding succeeds or fails. For a specific implementation of this step, refer to the descriptions of S309*a* and S309*b* in the foregoing embodiment. Details are not described herein again.

Figure 10:
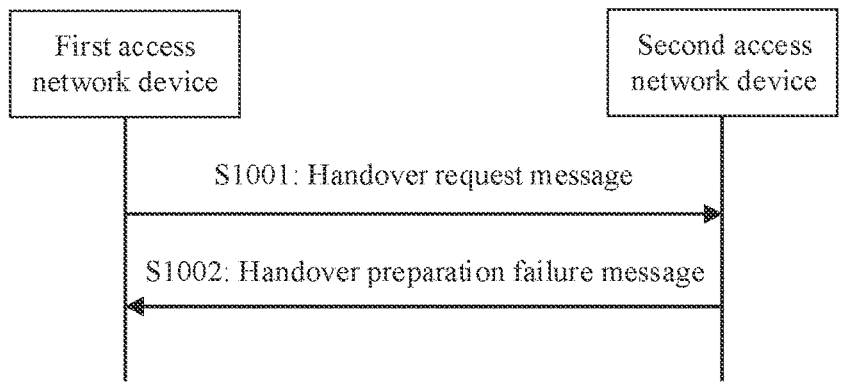
FIG. 10 is a schematic flowchart of another communication method according to an embodiment of this application.

FIG. 10 is a schematic flowchart of another communication method according to an embodiment of this application. This embodiment of this application includes at least the following steps.

S1001: A first access network device sends a handover request (handover request) message to a second access network device through an Xn interface. The handover request message is used to hand over a terminal device from a cell served by the first access network device to a target cell served by the second access network device. The handover request message includes information about an NPN that can be accessed by the terminal device.

S1002. If an NPN supported by the target cell conflicts with the NPN that can be accessed by the terminal device or conflicts with a target NPN, the second access network device sends a handover preparation failure (handover preparation failure) message to the first access network device. The handover preparation failure message includes information about an identifier of an NPN supported by the target cell or a target PLMN of the target cell, or information about an identifier of an onboarding NPN supported by the target PLMN of the target cell.

For example, the first access network device includes an allowed CAG list (allowed CAG list) of the terminal device in a mobility restriction list (mobility restriction list) of a handover message, and sends the handover message to the second access network device. If a CAG/PNI-NPN that can be accessed by the terminal device is not a CAG/PNI-NPN supported by any target cell, that is, the terminal device is not allowed to access the target cell, the second access network device includes, in the handover preparation failure message, a CAG ID/PNI-NPN and/or an NID that can be supported by the target cell or the target PLMN of the target cell, and sends the handover preparation failure message to the first access network device. For another example, the first access network device sends a target NID/SNPN to the second access network device. If the target cell does not support the target NID/SNPN, the second access network device includes, in the handover preparation failure message, an NID/SNPN and/or a PNI-NPN/CAG ID that can be supported by the target cell, and sends the handover preparation failure message to the first access network device. Optionally, the handover preparation failure message carries a cause value, and a failure cause may be that the provided CAG ID (CAG ED(s) not supported) is not supported, the provided NID (NID(s) not supported) is not supported, the provided SNPN (SNPN(s) not supported) is not supported, the provided PNI-NPN (PNI-NPN(s) not supported) is not supported, the CAG identifier is invalid (invalid CAG ID(s)), the NID is invalid (invalid NID(s)), the SNPN is invalid (invalid SNPN), the PNI-NPN is invalid (invalid PNI-NPN), only the CAG can be accessed (CAG-only access), or the like. In other words, it indicates that the CAG ID, the NID, the SNPN network, or the PNI-NPN network provided by the first access network device is not supported by the target cell served by the second access network device.

Similarly, in a handover process based on an NG interface, if the NPN supported by the target cell conflicts with the NPN that can be accessed by the terminal device or conflicts with the target NPN, the second access network device sends a handover failure (handover failure) message to an AMF, and the AMF sends a handover preparation failure (handover preparation failure) message to the first access network device. The handover failure (handover failure) message and the handover preparation failure (handover preparation failure) message sent by the AMF include the information about the identifier of the NPN supported by the target cell or the target PLMN of the target cell or the information about the identifier of the onboarding NPN supported by the target cell. For example, the first access network device sends a handover request (handover required) message to the AMF. The AMF includes an allowed CAG list (allowed CAG list) of the terminal device in a mobility restriction list (mobility restriction list) of the handover request (handover request) message, and sends the handover request message to the second access network device. If a CAG/PNI-NPN that can be accessed by the terminal device is not a CAG/PNI-NPN supported by any target cell, that is, the terminal device is not allowed to access the target cell, the second access network device includes, in a handover failure (handover failure) message, a CAG ID/PNI-NPN and/or an NID that can be supported by the target cell or the target PLMN of the target cell, and sends the handover failure message to the AMF. The AMF forwards, to the first access network device, the handover preparation failure message including the handover failure message. For another example, in an NG interface setup or update process, for example, by using an NG setup response (NG setup response) message and an AMF configuration update (AMF configuration update) message, the AMF notifies the first access network device and the second access network device of NID/SNPN information configured by the AMF. If the AMF can support only one NID/SNPN, the first access network device sends a handover required (handover required) message to the AMF in a handover process, where the message does not need to carry a serving MD and a target NID. Because the AMF supports only one NID, and the terminal device cannot be handed over between different NIDs in the standard, after receiving the handover request message sent by the first access network device, the AMF may learn of the target NID based on a current serving NID of the terminal device, where the handover request message includes a global RAN node identifier (Global RAN Node ID) of the second access network device. The AMF addresses the second access network device based on the identifier. If the second access network device does not support the NID, there may be no NG interface connection between the AMF and the second access network device, and the AMF cannot address the second access network device. Consequently, the handover fails. In this case, the AMF feeds back the handover preparation failure (handover preparation failure) message to the first access network device, where the message carries a failure cause value, for example, the invalid NID (invalid NID), an invalid global RAN node identifier (Global RAN Node ID), or a target access network device that is not found (target RAN not connected). Alternatively, there may be an NG interface connection between the AMF and the second access network device, and the AMF sends the handover request (handover request) message to the second access network device. If the AMF supports only one NID/SNPN, the AMF does not need to send the target NID/SNPN to the second access network device. If the target cell does not support the target NID/SNPN, the second access network device includes, in the handover failure (handover failure) message, the NID/SNPN and/or the PNI-NPN/CAG ID that can be supported by the target cell, and sends the handover failure message to the AMF. Then, the AMF forwards, to the first access network device, the handover preparation failure (handover preparation failure) message including the handover failure message. The handover failure (handover failure) message and/or the handover preparation failure message may carry the foregoing cause value. Details are not described again. If the handover fails because the second access network device originally supports the target NID/SNPN and no longer supports the target NID/SNPN after the configuration information is updated, but the second access network device does not perform configuration update with the AMF in time, after receiving the handover request message sent by the AMF, the second access network device may also be triggered to send a RAN configuration update (RAN configuration update) message, a NG reset (NG reset) message, or an error indication (error indication) message to the AMF, to update the NID/SNPN configuration information of the second access network device. The message may include the foregoing cause value. Details are not described again.

The method in embodiments of this application is described above in detail, and an apparatus in embodiments of this application is provided below.

Figure 11:
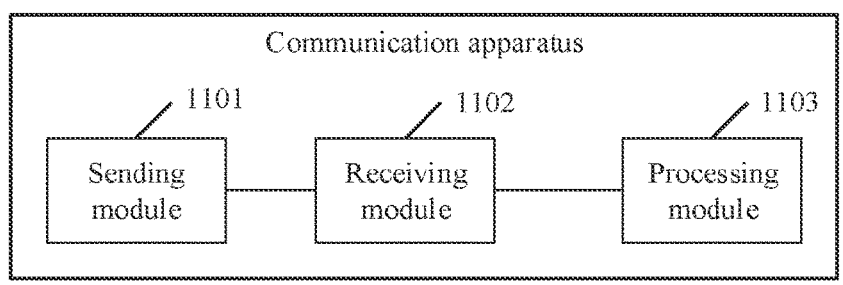
FIG. 11 is a schematic diagram of a communication apparatus according to an embodiment of this application.

FIG. 11 is a schematic diagram of a communication apparatus according to an embodiment of this application. The communication apparatus includes at least a sending module 1101, a receiving module 1102, and a processing module 1103.

The sending module 1101 is configured to send a first message to a terminal device, where the first message indicates that a cell served by a first access network device supports NPN onboarding.

The receiving module 1102 is configured to receive a second message sent by the terminal device, where the second message indicates that the terminal device requests NPN onboarding.

Optionally, the processing module 1103 is configured to: verify whether the terminal device has onboarded at least one NPN supported by a first cell; and if the terminal device has not onboarded the at least one NPN supported by the first cell, determine that the terminal device requests to onboard the NPN supported by the first cell.

Optionally, the processing module 1103 is configured to: verify whether a second network is an onboarded network; and if the second network is not an onboarded network, determine that the terminal device requests to onboard an NPN corresponding to information about an identifier of the second network.

Optionally, the sending module 1101 is further configured to send a third message to the terminal device, where the third message indicates that NPN onboarding of the terminal device succeeds.

Optionally, the sending module 1101 is further configured to send a fourth message to the terminal device, where the fourth message indicates a cause value used by the first access network device to reject the request of the terminal device for NPN onboarding.

Optionally, the receiving module 1102 is further configured to receive a fifth message sent by a core network device, where the fifth message indicates a cause value used by the core network device to reject the request of the terminal device for NPN onboarding.

Optionally, the sending module 1101 is further configured to send a sixth message to the core network device, where the sixth message indicates that the terminal device requests NPN onboarding.

Optionally, the receiving module 1102 is further configured to receive a seventh message sent by the core network device, where the seventh message indicates that NPN onboarding of the terminal device succeeds or indicates that onboarding of the terminal device fails.

Optionally, the receiving module 1102 is further configured to receive an eighth message sent by the core network device, where the eighth message indicates an onboarding NPN supported by the core network device.

Optionally, the sending module 1101 is further configured to send the first message to the terminal device, where the first message indicates that a cell served by a first distributed unit supports NPN onboarding and/or a cell served by a second distributed unit supports NPN onboarding.

The receiving module 1102 is further configured to receive the second message sent by the terminal device, where the second message indicates that the terminal device requests NPN onboarding.

For content and functions included in the messages, refer to the descriptions in the foregoing method embodiments. Details are not described herein again.

It should be noted that, for implementations of the modules, refer to corresponding descriptions of the method embodiments shown in FIG. 3 to FIG. 10. The method and the functions performed by the first access network device in the foregoing embodiments are performed.

Figure 12:
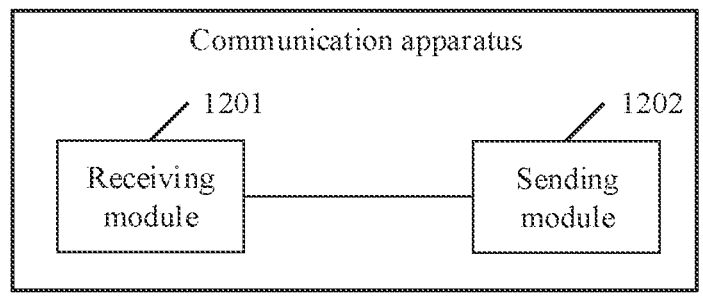
FIG. 12 is a schematic diagram of another communication apparatus according to an embodiment of this application.

FIG. 12 is a schematic diagram of another communication apparatus according to an embodiment of this application. The communication apparatus includes at least a receiving module 1201 and a sending module 1202.

The receiving module 1201 is configured to receive a first message sent by a first access network device, where the first message indicates that a cell served by the first access network device supports NPN onboarding.

The sending module 1202 is configured to send a second message to the first access network device, where the second message indicates that the terminal device requests NPN onboarding.

Optionally, the receiving module 1201 is further configured to receive a third message sent by the first access network device, where the third message indicates that NPN onboarding of the terminal device succeeds.

Optionally, the receiving module 1201 is further configured to receive a fourth message sent by the first access network device, where the fourth message indicates a cause value used by the first access network device to reject the request of the terminal device for NPN onboarding.

For content and functions included in the messages, refer to the descriptions in the foregoing method embodiments. Details are not described herein again.

It should be noted that, for implementations of the modules, refer to corresponding descriptions of the method embodiments shown in FIG. 3 to FIG. 10. The method and the functions performed by the terminal device in the foregoing embodiments are performed.

Figure 13:
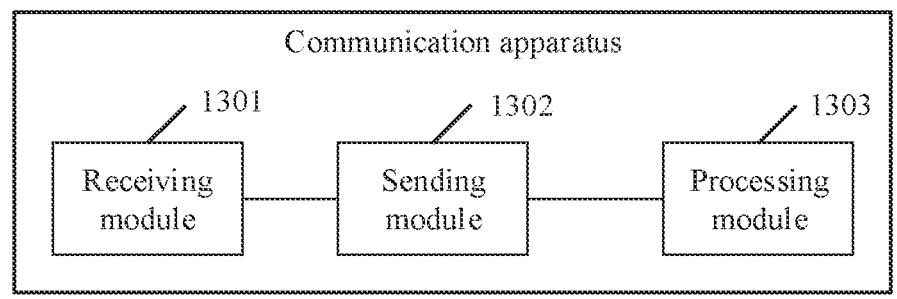
FIG. 13 is a schematic diagram of another communication apparatus according to an embodiment of this application.

FIG. 13 is a schematic diagram of another communication apparatus according to an embodiment of this application. The communication apparatus includes at least a receiving module 1301, a sending module 1302, and a processing module 1303.

The receiving module 1301 is configured to receive a first message sent by a first access network device, where the first message indicates that a terminal device requests NPN onboarding.

The sending module 1302 is configured to send a second message to the first access network device, where the second message indicates that NPN onboarding of the terminal device succeeds.

Optionally, the processing module 1303 is configured to: verify whether the terminal device has onboarded at least one NPN supported by a first cell; and if the terminal device has not onboarded the at least one NPN supported by the first cell, determine that the terminal device requests to onboard the NPN supported by the first cell.

Optionally, the processing module 1303 is configured to: verify whether a first network is an onboarded network; and if the first network is not an onboarded network, determine that the terminal device requests to onboard an NPN corresponding to information about an identifier of the first network.

Optionally, the sending module 1302 is further configured to send a third message to the first access network device, where the third message indicates an onboarding NPN supported by a core network device.

For content and functions included in the messages, refer to the descriptions in the foregoing method embodiments. Details are not described herein again.

It should be noted that, for implementations of the modules, refer to corresponding descriptions of the method embodiments shown in FIG. 3 to FIG. 10. The method and the functions performed by the core network device in the foregoing embodiments are performed.

Figure 14:
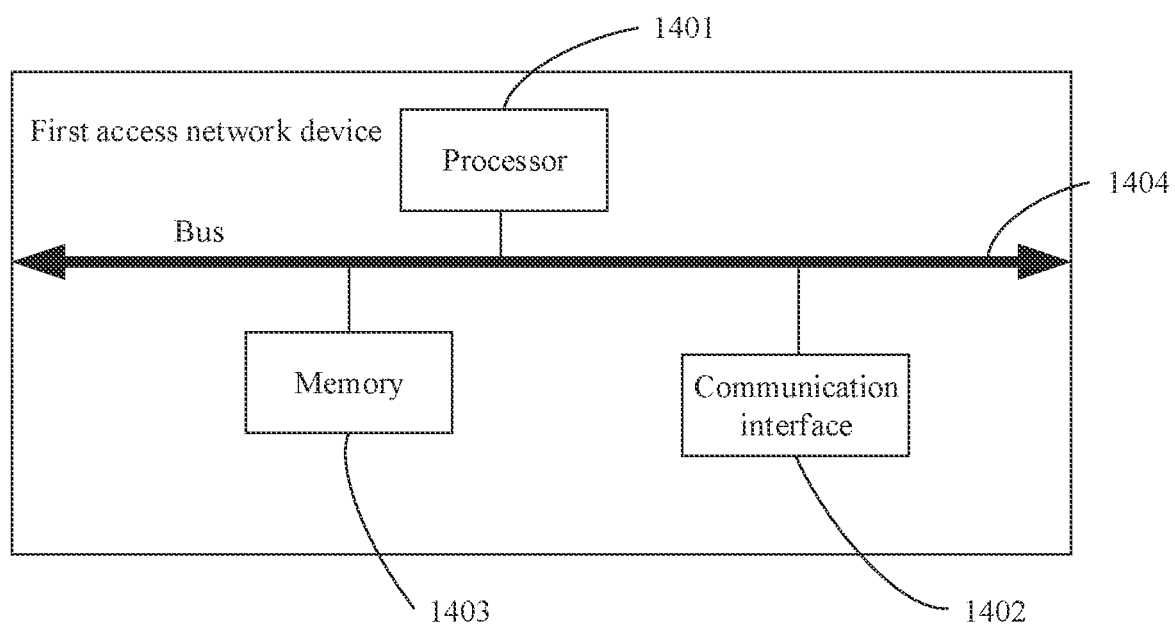
FIG. 14 is a schematic diagram of a structure of a first access network device according to an embodiment of this application.

FIG. 14 is a schematic diagram of a structure of a first access network device according to an embodiment of this application. As shown in FIG. 14, the first access network device may include at least one processor 1401, at least one communication interface 1402, and at least one memory 1403. Optionally, the first access network device may further include at least one communication bus 1404.

The processor 1401 may be a central processing unit, a general-purpose processor, a digital signal processor, an application-specific integrated circuit, a field programmable gate array or another programmable logic device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The communication bus 1404 may be a peripheral component interconnect PCI bus, an extended industry standard architecture EISA bus, and the like. The bus may be classified into an address bus, a data bus, a control bus, and the like. For ease of representation, only one thick line is used to represent the bus in FIG. 14, but this does not mean that there is only one bus or only one type of bus. The communication bus 1404 is configured to implement connection and communication between these components. The communication interface 1402 of the device in this embodiment of this application is configured to perform signaling or data communication with another node device. The memory 1403 may include a volatile memory, for example, a nonvolatile random access memory (nonvolatile random access memory, NVRAM), a phase change random access memory (phase change RAM, PRAM), or a magnetoresistive random access memory (magetoresistive RAM, MRAM). The memory may further include a nonvolatile memory, for example, at least one magnetic disk storage device, an electrically erasable programmable read-only memory (electrically erasable programmable read-only memory, EEPROM), a flash memory component, for example, an NOR flash memory (NOR flash memory) or an NAND flash memory (NAND flash memory), or a semiconductor device, for example, a solid-state drive (solid state disk, SSD). Optionally, the memory 1403 may be at least one storage apparatus far away from the processor 1401. Optionally, the memory 1403 may further store a group of program code. Optionally, the processor 1401 may further execute a program stored in the memory 1403.

The processor 1401 is configured to: send a first message to a terminal device, where the first message indicates that a cell served by a first access network device supports NPN onboarding; and receive a second message sent by the terminal device, where the second message indicates that the terminal device requests NPN onboarding.

Optionally, the processor 1401 is further configured to perform the following operations:

verifying whether the terminal device has onboarded at least one NPN supported by a first cell; and if the terminal device has not onboarded the at least one NPN supported by the first cell, determining that the terminal device requests to onboard the NPN supported by the first cell.

Optionally, the processor 1401 is further configured to perform the following operations:

verifying whether a second network is an onboarded network; and if the second network is not an onboarded network, determining that the terminal device requests to onboard an NPN corresponding to information about an identifier of the second network.

Optionally, the processor 1401 is further configured to perform the following operation:

sending a third message to the terminal device, where the third message indicates that NPN onboarding of the terminal device succeeds.

Optionally, the processor 1401 is further configured to perform the following operation:

sending a fourth message to the terminal device, where the fourth message indicates a cause value used by the first access network device to reject the request of the terminal device for NPN onboarding.

Optionally, the processor 1401 is further configured to perform the following operation:

receiving a fifth message sent by a core network device, where the fifth message indicates a cause value used by the core network device to reject the request of the terminal device for NPN onboarding.

Optionally, the processor 1401 is further configured to perform the following operations:

sending a sixth message to the core network device, where the sixth message indicates that the terminal device requests NPN onboarding; and receiving a seventh message sent by the core network device, where the seventh message indicates that NPN onboarding of the terminal device succeeds or indicates that onboarding of the terminal device fails.

Optionally, the processor 1401 is further configured to perform the following operation:

receiving an eighth message sent by the core network device, where the eighth message indicates an onboarding NPN supported by the core network device.

Optionally, the processor 1401 is further configured to perform the following operations:

sending the first message to the terminal device, where the first message indicates that a cell served by a first distributed unit supports NPN onboarding and/or a cell served by a second distributed unit supports NPN onboarding; and receiving the second message sent by the terminal device, where the second message indicates that the terminal device requests NPN onboarding.

For content and functions included in the messages, refer to the descriptions in the foregoing method embodiments. Details are not described herein again.

Further, the processor may cooperate with the memory and the communication interface to perform the operations of the first access network device in the foregoing embodiments of this application.

Figure 15:
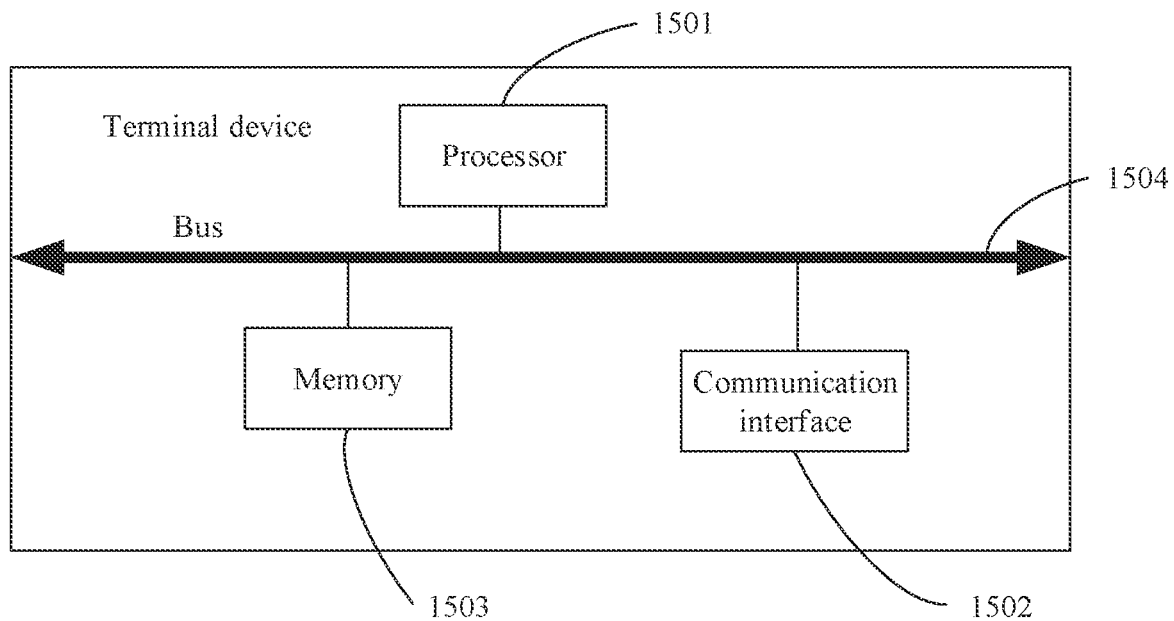
FIG. 15 is a schematic diagram of a structure of a terminal device according to an embodiment of this application.

FIG. 15 is a schematic diagram of a structure of a terminal device according to an embodiment of this application. As shown in the figure, the terminal device may include at least one processor 1501, at least one communication interface 1502, and at least one memory 1503. Optionally, the terminal device may further include at least one communication bus 1504.

The processor 1501 may be processors of various types mentioned above. The communication bus 1504 may be a peripheral component interconnect PCI bus, an extended industry standard architecture EISA bus, and the like. The bus may be classified into an address bus, a data bus, a control bus, and the like. For ease of representation, only one thick line is used to represent the bus in FIG. 15, but this does not mean that there is only one bus or only one type of bus. The communication bus 1504 is configured to implement connection and communication between these components. The communication interface 1502 of the device in this embodiment of this application is configured to perform signaling or data communication with another node device. The memory 1503 may be memories of various types mentioned above. Optionally, the memory 1503 may be at least one storage apparatus far away from the processor 1501. The memory 1503 stores a group of program code, and the processor 1501 executes a program in the memory 1503.

The processor 1501 is configured to: receive a first message sent by a first access network device, where the first message indicates that a cell served by the first access network device supports NPN onboarding; and send a second message to the first access network device, where the second message indicates that the terminal device requests NPN onboarding.

Optionally, the processor 1501 is further configured to perform the following operation:

receiving a third message sent by the first access network device, where the third message indicates that NPN onboarding of the terminal device succeeds.

Optionally, the processor 1501 is further configured to perform the following operation:

receiving a fourth message sent by the first access network device, where the fourth message indicates a cause value used by the first access network device to reject the request of the terminal device for NPN onboarding.

For content and functions included in the messages, refer to the descriptions in the foregoing method embodiments. Details are not described herein again.

Further, the processor may cooperate with the memory and the communication interface to perform the operations of the terminal device in the foregoing embodiments of this application.

Figure 16:
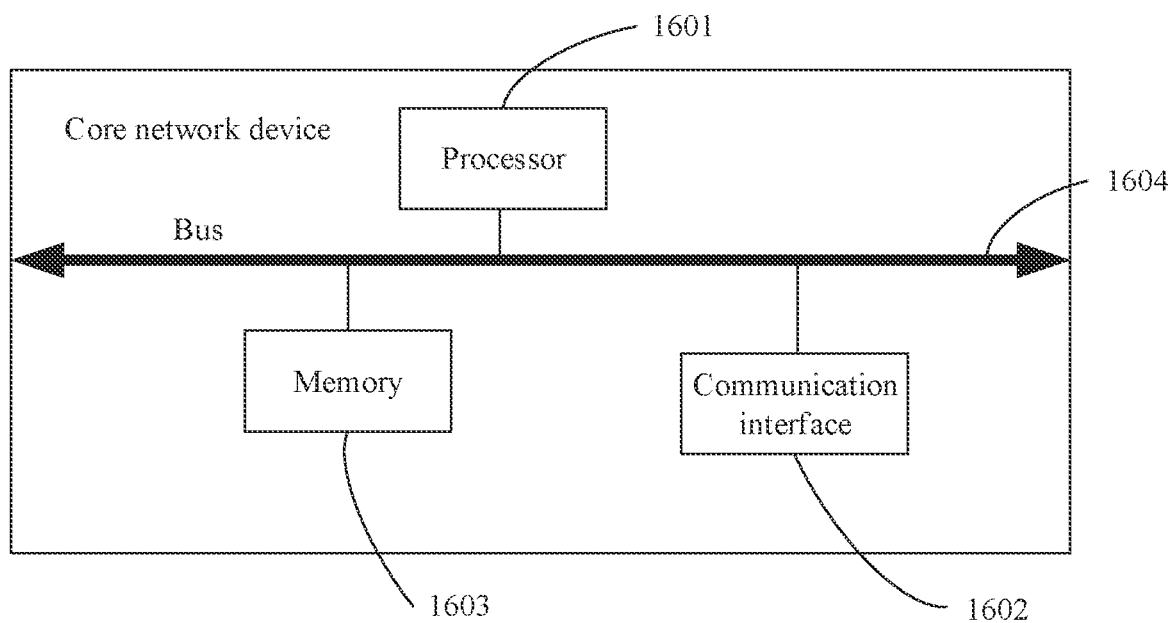
FIG. 16 is a schematic diagram of a structure of a core network device according to an embodiment of this application.

FIG. 16 is a schematic diagram of a structure of a core network device according to an embodiment of this application. As shown in the figure, the core network device may include at least one processor 1601, at least one communication interface 1602, and at least one memory 1603. Optionally, the core network device may further include at least one communication bus 1604.

The processor 1601 may be processors of various types mentioned above. The communication bus 1604 may be a peripheral component interconnect PCI bus, an extended industry standard architecture EISA bus, and the like. The bus may be classified into an address bus, a data bus, a control bus, and the like. For ease of representation, only one thick line is used to represent the bus in FIG. 16, but this does not mean that there is only one bus or only one type of bus. The communication bus 1604 is configured to implement connection and communication between these components. The communication interface 1602 of the device in this embodiment of this application is configured to perform signaling or data communication with another node device. The memory 1603 may be memories of various types mentioned above. Optionally, the memory 1603 may be at least one storage apparatus far away from the processor 1601. The memory 1603 stores a group of program code, and the processor 1601 executes a program in the memory 1603.

The processor 1601 is configured to: receive a first message sent by a first access network device, where the first message indicates that a terminal device requests NPN onboarding; and send a second message to the first access network device, where the second message indicates that NPN onboarding of the terminal device succeeds.

Optionally, the processor 1601 is further configured to perform the following operations:

verifying whether the terminal device has onboarded at least one NPN supported by a first cell; and if the terminal device has not onboarded the at least one NPN supported by the first cell, determining that the terminal device requests to onboard the NPN supported by the first cell.

Optionally, the processor 1601 is further configured to perform the following operations:

verifying whether a first network is an onboarded network; and if the first network is not an onboarded network, determining that the terminal device requests to onboard an NPN corresponding to information about an identifier of the first network.

Optionally, the processor 1601 is further configured to perform the following operation.

sending a third message to the first access network device, where the third message indicates an onboarding NPN supported by the core network device.

For content and functions included in the messages, refer to the descriptions in the foregoing method embodiments. Details are not described herein again.

Further, the processor may cooperate with the memory and the communication interface to perform the operations of the core network device in the foregoing embodiments of this application.

An embodiment of this application further provides a chip system. The chip system includes a processor, configured to support a first access network device, a terminal device, or a core network device to implement functions in any one of the foregoing embodiments, for example, generating or processing data and/or information in the foregoing method. In a possible design, the chip system may further include a memory. The memory is configured to store program instructions and data that are necessary for the first access network device, the terminal device, or the core network device. The chip system may include a chip, or may include a chip and another discrete device.

An embodiment of this application further provides a processor, configured to be coupled to a memory, and configured to perform any method and any function that are related to the first access network device, the terminal device, or the core network device in any one of the foregoing embodiments.

An embodiment of this application further provides a computer program product including instructions. When the computer program product runs on a computer, the computer is enabled to perform any method and any function that are related to the first access network device, the terminal device, or the core network device in any one of the foregoing embodiments.

An embodiment of this application further provides an apparatus, configured to perform any method and any function that are related to the first access network device, the terminal device, or the core network device in any one of the foregoing embodiments.

An embodiment of this application further provides a wireless communication system. The system includes at least one access network device, at least one terminal device, and at least one core network device in any one of the foregoing embodiments.

All or some of the foregoing embodiments may be implemented through software, hardware, firmware, or any combination thereof. When software is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk (SSD)), or the like.

The objectives, technical solutions, and beneficial effects of this application are further described in detail in the foregoing specific implementations. Any modification, equivalent replacement, or improvement made without departing from the principle of this application shall fall within the protection scope of this application.

The invention claimed is:

1. A communication method, wherein the method comprises:
sending, by a first access network device, a system information block to a terminal device, wherein the system information block comprises first information indicating that a cell served by the first access network device supports non-public network (NPN) onboarding, wherein the first information comprises second information indicating a supported onboarding NPN, and the second information comprises at least one of information about an identifier of the supported onboarding NPN or first indication information, wherein the first indication information indicates a support of onboarding; and
receiving, by the first access network device, a radio resource control (RRC) setup complete message from the terminal device, wherein the RRC setup complete message indicates that the terminal device requests NPN onboarding.

2. The method according to claim 1, wherein the identifier of the NPN includes at least one of a public land mobile network identifier (PLMN ID) or a network identifier (NID).

3. The method according to claim 1, wherein the RRC setup complete message comprises information indicating a requested onboarding NPN, and the information indicating the requested onboarding NPN comprises at least one of information about an identifier of the requested onboarding NPN or second indication information, wherein the second indication information indicates a request for onboarding.

4. The method according to claim 1, wherein the method further comprises:
receiving, by the first access network device, an eighth message from a core network device, wherein the eighth message indicates an onboarding NPN supported by the core network device.

5. The method according to claim 4, wherein the eighth message comprises information indicating the supported onboarding NPN, and the information indicating the supported onboarding NPN includes at least one of the identifier of the supported onboarding NPN or indication information, wherein the indication information indicates whether a corresponding NPN configured by the core network device supports onboarding or indicates whether an NPN broadcast by a cell supports onboarding.

6. The method according to claim 4, wherein the eighth message is a next generation (NG) interface setup response, an access and mobility management function (AMF) configuration update message, or a radio access network (RAN) configuration update acknowledgment message.

7. The method according to claim 1, wherein the method further comprises:
sending, by the first access network device, a third message to the terminal device, wherein the third message indicates that NPN onboarding of the terminal device succeeds, and wherein the third message comprises information indicating a successfully onboarded NPN, and the information indicating the successfully onboarded NPN comprises at least one of information about an identifier of the successfully onboarded NPN or third indication information, wherein the third indication information indicates that onboarding succeeds.

8. The method according to claim 1, wherein the method further comprises:
sending, by the first access network device, a fourth message to a core network device, wherein the fourth message indicates that the terminal device requests NPN onboarding; and
receiving, by the first access network device, a fifth message sent by the core network device, wherein the fifth message indicates that NPN onboarding of the terminal device succeeds or indicates that onboarding of the terminal device fails.

9. A communication apparatus, comprising:
at least one processor; and
a non-transitory computer-readable medium including computer-executable instructions that, when executed by the at least one processor, cause the apparatus to perform operations comprising:
sending a system information block to a terminal device, wherein the system information block comprises first information indicating that a cell served by a first access network device supports non-public network (NPN) onboarding, wherein the first information comprises second information indicating a supported onboarding NPN, and the second information comprises at least one of information about an identifier of the supported onboarding NPN or first indication information, wherein the first indication information indicates a support of onboarding; and receiving a radio resource control (RRC) setup complete message from the terminal device, wherein the RRC setup complete message indicates that the terminal device requests NPN onboarding.

10. The apparatus according to claim 9, wherein the identifier of the NPN includes at least one of a public land mobile network identifier (PLMN ID) or a network identifier (NID).

11. The apparatus according to claim 9, wherein the RRC setup complete message comprises information indicating a requested onboarding NPN, and the information indicating the requested onboarding NPN comprises at least one of information about an identifier of the requested onboarding NPN or second indication information, wherein the second indication information indicates a request for onboarding.

12. The apparatus according to claim 9, wherein the operations further comprise:
receiving an eighth message from a core network device, wherein the eighth message indicates an onboarding NPN supported by the core network device.

13. The apparatus according to claim 12, wherein the eighth message comprises information indicating the supported onboarding NPN, and the information indicating the supported onboarding NPN includes at least one of the identifier of the supported onboarding NPN or indication information, wherein the indication information indicates whether a corresponding NPN configured by the core network device supports onboarding or indicates whether an NPN broadcast by a cell supports onboarding.

14. The apparatus according to claim 12, wherein the eighth message is a next generation (NG) interface setup response, an access and mobility management function (AMF) configuration update message, or a radio access network (RAN) configuration update acknowledgment message.

15. The apparatus according to claim 9, wherein the operations further comprise:
sending a third message to the terminal device, wherein the third message indicates that NPN onboarding of the terminal device succeeds, and wherein the third message comprises information indicating a successfully onboarded NPN, and the information indicating the successfully onboarded NPN comprises at least one of information about an identifier of the successfully onboarded NPN or third indication information, wherein the third indication information indicates that onboarding succeeds.

16. The apparatus according to claim 9, wherein the operations further comprise:

sending a fourth message to a core network device, wherein the fourth message indicates that the terminal device requests NPN onboarding; and
receiving a fifth message sent by the core network device, wherein the fifth message indicates that NPN onboarding of the terminal device succeeds or indicates that onboarding of the terminal device fails.

17. A communication apparatus, comprising:
at least one processor; and
a non-transitory computer-readable medium including computer-executable instructions that, when executed by the at least one processor, cause the apparatus to perform operations comprising:
receiving a system information block from a first access network device, wherein the system information block comprises first information indicating that a cell served by the first access network device supports non-public network (NPN) onboarding, wherein the first information comprises second information indicating a supported onboarding NPN, and the second information comprises at least one of information about an identifier of the supported onboarding NPN or first indication information, wherein the first indication information indicates a support of onboarding; and
sending a radio resource control (RRC) setup complete message to the first access network device, wherein the RRC setup complete message indicates that a terminal device requests NPN onboarding.

18. The apparatus according to claim 17, wherein the identifier of the NPN includes at least one of a public land mobile network identifier (PLMN ID) or a network identifier (NID).

19. The apparatus according to claim 17, wherein the RRC setup complete message comprises the second information.

20. The apparatus according to claim 17, wherein the operations further comprise:
receiving a third message sent by the first access network device, wherein the third message indicates that NPN onboarding of the terminal device succeeds, and wherein the third message comprises information indicating a successfully onboarded NPN, and the information indicating the successfully onboarded NPN comprises at least one of information about an identifier of the successfully onboarded NPN or third indication information, wherein the third indication information indicates that onboarding succeeds.

* * * * *